(12) United States Patent
Lucke et al.

(10) Patent No.: US 11,555,759 B2
(45) Date of Patent: Jan. 17, 2023

(54) EQUIPMENT CONTROL SYSTEM

(71) Applicant: Transportation IP Holdings, LLC, Norwalk, CT (US)

(72) Inventors: Christopher Lucke, Wilmerding, PA (US); Jeffrey Hritz, Wilmerding, PA (US); Ajith Kuttannair Kumar, Erie, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 367 days.

(21) Appl. No.: 16/727,017

(22) Filed: Dec. 26, 2019

(65) Prior Publication Data
US 2020/0132570 A1 Apr. 30, 2020

Related U.S. Application Data

(63) Continuation-in-part of application No. 16/438,230, filed on Jun. 11, 2019, which is a continuation of
(Continued)

(51) Int. Cl.
*G01M 15/11* (2006.01)
*G01M 15/12* (2006.01)
(Continued)

(52) U.S. Cl.
CPC .......... *G01M 15/11* (2013.01); *F02B 63/047* (2013.01); *F02D 29/02* (2013.01); *F02D 29/06* (2013.01); *F02D 41/0085* (2013.01); *F02D 41/0097* (2013.01); *F02D 41/22* (2013.01); *G01M 15/12* (2013.01); *B60L 50/10* (2019.02);
(Continued)

(58) Field of Classification Search
CPC ......... B60G 11/26; B60L 50/10; B60N 2/525; B60R 16/08; B60T 13/261; B60T 13/662; B60T 13/683; B60T 17/02; B60Y 2300/1886; F02B 63/047; F02D 2041/288; F02D 2200/1002; F02D 2200/101; F02D 29/02; F02D 29/06; F02D 41/0085; F02D 41/0097; F02D 41/1498; F02D 41/22; F04B 49/20; G01M 15/11; G01M 15/12
See application file for complete search history.

(56) References Cited

U.S. PATENT DOCUMENTS 5,232,052 A * 8/1993 Arvidson ............. G05D 11/131
169/44
2007/0188013 A1* 8/2007 Hoffman ................. B60T 17/02
303/10

(Continued)

*Primary Examiner* — Peter D Nolan
*Assistant Examiner* — Ce Li Li
(74) *Attorney, Agent, or Firm* — The Small Patent Law Group LLC; Joseph M. Butscher

(57) ABSTRACT

A system and method monitor operation of a compressor, determine whether the operation of the compressor is outside of a designated range of values, and, responsive to determining that the operation of the compressor is outside of the designated range of values, one or more of (a) prevent communication of a signal to a system controller that controls operation of the compressor, (b) direct a gas from a reservoir to a pressure sensor used by the system controller to determine a gas pressure generated by the compressor, and/or (c) communicate the signal to the system controller that controls operation of the compressor.

21 Claims, 18 Drawing Sheets

Related U.S. Application Data application No. 15/063,043, filed on Mar. 7, 2016, now Pat. No. 10,345,195.

(51) Int. Cl.
| | |
|---|---|
| *F02D 29/02* | (2006.01) |
| *F02D 41/00* | (2006.01) |
| *F02D 41/22* | (2006.01) |
| *F02D 29/06* | (2006.01) |
| *F02B 63/04* | (2006.01) |
| *B60L 50/10* | (2019.01) |
| *F02D 41/28* | (2006.01) |
| *F02D 41/14* | (2006.01) |

(52) U.S. Cl.
CPC .... *F02D 41/1498* (2013.01); *F02D 2041/288* (2013.01); *F02D 2200/101* (2013.01); *F02D 2200/1002* (2013.01); *Y02T 10/40* (2013.01)

(56) References Cited

U.S. PATENT DOCUMENTS

| 2015/0176575 A1* | 6/2015 | Nemeth | F04B 49/022 |
| | | | 417/34 |
| 2017/0305372 A1* | 10/2017 | Adler | B60T 13/662 |
| 2021/0057628 A1* | 2/2021 | Lang | G06F 1/206 |

* cited by examiner

EQUIPMENT CONTROL SYSTEM

CROSS-REFERENCE TO RELATED APPLICATIONS

This application is a continuation-in-part of U.S. patent application Ser. No. 16/438,230, filed on 11 Jun. 2019, which is a continuation of U.S. patent application Ser. No. 15/063,043, filed on 7 Mar. 2016 (now U.S. Pat. No. 10,345,195). These applications are incorporated by reference herein in their entirety including the drawings.

BACKGROUND

Technical Field

The subject matter described relates to devices that monitor powered components, such as those of a vehicle. Not all embodiments of the subject matter described herein, however, are limited to components disposed onboard vehicles.

Discussion of Art

Some powered components rely on the supply of material to safely operate. For example, compressors may need a supply of air or another liquid being compressed by the compressor to ensure continued and safe operation of the compressors. Failure to supply the air or liquid to the compressors can cause the compressors to become damaged or fail.

Some vehicles have onboard compressors that compress air for components of the vehicle. For example, vehicles having air brakes may rely on onboard compressors to maintain air pressure in the air brakes. These compressors may rely on continued supply of air to ensure safe operation. If the supply of air is interrupted, motors of the compressors may become damaged and/or fail. Additionally, if an operating temperature of a compressor becomes too hot, the compressor may be damaged or fail.

BRIEF DESCRIPTION

In one embodiment, a method includes monitoring operation of a compressor, determining whether the operation of the compressor is outside of a designated range of values, and, responsive to determining that the operation of the compressor is outside of the designated range of values, one or more of (a) preventing communication of a signal to a system controller that controls operation of the compressor, (b) directing a gas from a reservoir to a pressure sensor used by the system controller to determine a gas pressure generated by the compressor, and/or (c) communicating the signal to the system controller that controls operation of the compressor.

In one embodiment, a system includes an equipment controller configured to monitor monitoring operation of a compressor. The equipment controller is configured to determine whether the operation of the compressor is outside of a designated range of values. The equipment controller also is configured to one or more of (a) prevent communication of a signal from the compressor to a system controller that controls operation of the compressor and/or (b) direct a gas from a reservoir to a pressure sensor used by the system controller to determine a gas pressure generated by the compressor responsive to determining that the operation of the compressor is outside of the designated range of values.

In one embodiment, a system includes a compressor configured to be disposed onboard a vehicle and to operate to increase a gas pressure in one or more conduits of the vehicle, a system controller configured to control operation of the compressor, and an equipment controller configured to monitor monitoring operation of the compressor. The equipment controller is configured to determine whether the operation of the compressor is outside of a designated range of values. The equipment controller is configured to one or more of (a) prevent communication of a signal from the compressor to the system controller that controls operation of the compressor and/or (b) direct a gas from a reservoir to a pressure sensor used by the system controller to determine a gas pressure generated by the compressor responsive to determining that the operation of the compressor is outside of the designated range of values.

In one embodiment, a method includes determining a range of designated values for operation of a compressor using machine learning, determining whether a monitored or sensed designated value of the operation of the compressor is within the range of designated values, and, responsive to determining that at least one of the monitored or sensed designated values is outside of the one or more designated range, one or more of (a) preventing communication of a signal from the compressor to a system controller that controls operation of the compressor, (b) directing a gas from a reservoir to a pressure sensor used by the system controller to determine a gas pressure generated by the compressor, (c) shutting down the compressor, and/or (d) switching the compressor to an unloaded state.

BRIEF DESCRIPTION OF THE DRAWINGS

The inventive subject matter may be understood from reading the following description of non-limiting embodiments, with reference to the attached drawings, wherein below.

DETAILED DESCRIPTION

One or more embodiments described herein relate to systems and methods for control of engine-related systems, e.g., for control of an engine or a system related to the engine based on a diagnosis of the engine. Furthermore, embodiments of the subject matter disclosed herein use engine and/or generator data, such as measured generator electrical parameters or generator data (e.g., DC link voltage, AC bus voltage or current, engine speed, engine shaft torque, alternator output voltage) derived from measured generator electrical parameters and/or engine parameters (e.g., speed), to diagnose conditions of one or more engines or auxiliary equipment and to distinguish between conditions and associated engine components and auxiliary equipment.

The engine may be included in a vehicle, such as a locomotive system. Other suitable types of vehicles may include on-highway vehicles, and off-highway vehicles other than locomotives, such as mining equipment, aircraft, and marine vessels. Other embodiments of the invention may be used for stationary engines such as wind turbines or power generators. The engine may be a diesel engine, or may combust another fuel or combination of fuels. Such alternative fuels may include gasoline, kerosene, biodiesel, natural gas, and ethanol—as well as combinations of the foregoing. Suitable engines may use compression ignition and/or spark ignition. Further, in some embodiments, the engine may be included in a system (e.g., vehicle system or stationary platform) that includes multiple engines, and each engine may be diagnosed to determine if imbalance is present according to embodiments disclosed herein.

Figure 1:
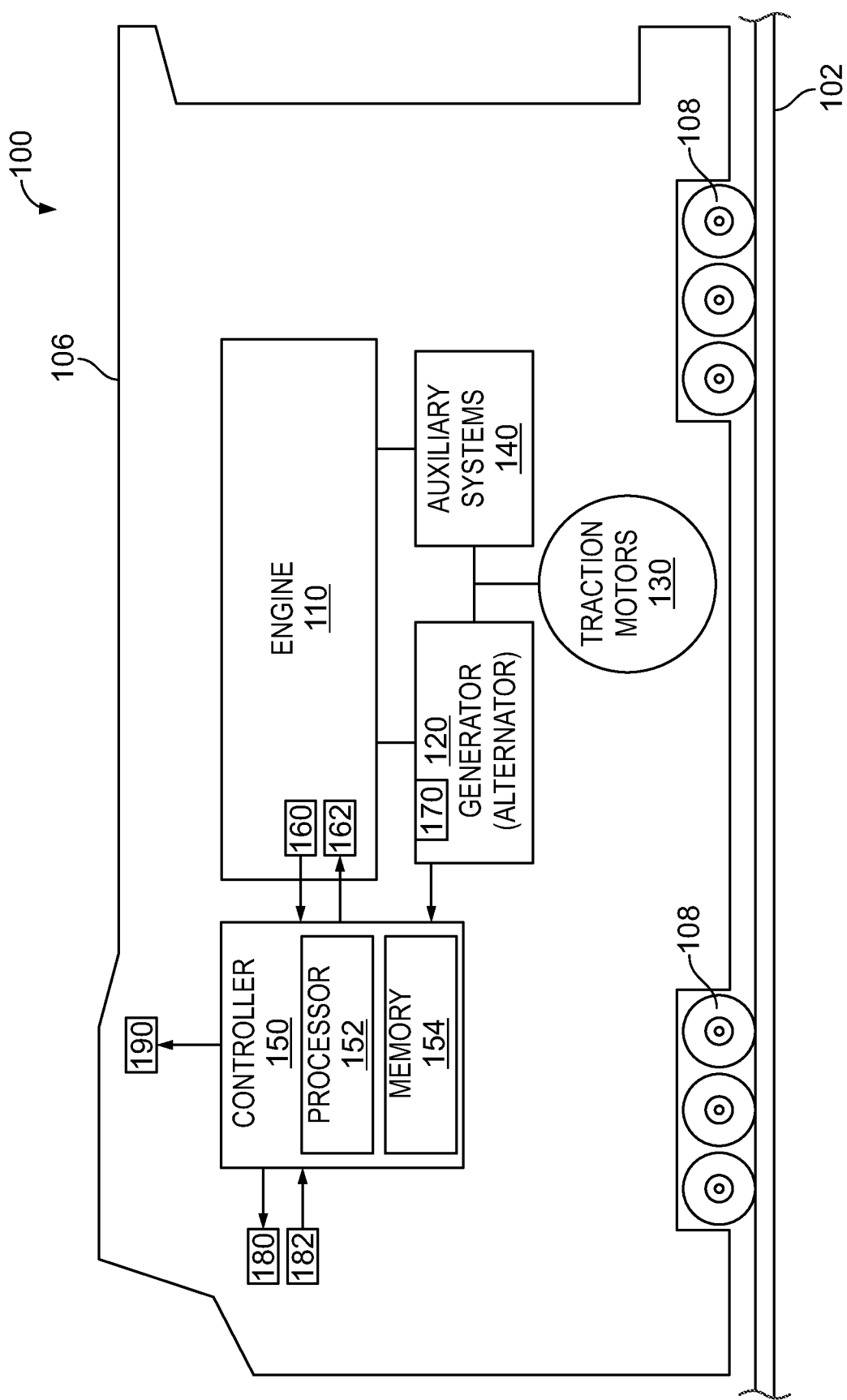
FIG. 1 shows an embodiment of a vehicle system.

FIG. 1 is an illustration of an embodiment of a vehicle system 100 (e.g., a locomotive system) herein depicted as a rail vehicle 106 configured to run on a rail 102 via a plurality of wheels 108. As depicted, the rail vehicle 106 includes an engine 110 operatively connected to a generator (alternator) 120. The engine 110 receives intake air for combustion from an intake passage. The engine may include a plurality of cylinders, and each cylinder may be configured to combust intake air and fuel. Exhaust gas resulting from combustion in the engine 110 is supplied to an exhaust passage. Exhaust gas flows through the exhaust passage, and out of an exhaust stack of the vehicle 106. The vehicle 106 also includes traction motors 130 operatively connected to the generator 120 for driving the wheels 108. The vehicle 106 further includes various auxiliary systems or equipment 140 operatively connected to the generator 120 or the engine 110 (e.g., the rotatable engine shaft 111, see FIG. 2) for performing various functions. The generator may include secondary coils that drive the auxiliary systems, where the main coils of the generator are used to drive the traction motors, in one embodiment.

The vehicle 106 further includes a controller 150 to control various components related to the vehicle system 100. In one example, controller 150 includes a computer control system. In one embodiment, the computer control system is largely software based and includes a processor, such as processor 152, configured to execute computer operable instructions. The control system optionally can be referred to as a vehicle control system. The controller 150 further includes computer readable storage media stored in memory 154 including code for enabling on-board monitoring and control of rail vehicle operation. The controller 150 may include multiple engine control units (ECU) and the control system may be distributed among each of the ECUs. The controller 150 further includes computer readable storage media, such as memory 154, including instructions (e.g., computer executable instructions) for enabling on-board monitoring and control of rail vehicle operation. Memory 154 may include volatile and non-volatile memory storage. In accordance with another embodiment, the controller may be hardware based using, for example, digital signal processors (DSPs) or other hardware logic circuitry to perform the various functions described herein.

The controller may oversee control and management of the vehicle system 100. The controller may receive signals various engine sensors 160, such as an engine speed sensor, or from various generator sensors 170 to determine operating parameters and operating conditions, and correspondingly adjust various engine actuators 162, such as traction motors, alternator, cylinder valves, throttle, etc., to control operation of the rail vehicle 106. In accordance with an embodiment, the engine speed sensor includes a multi-tooth pick-up wheel connected to the engine shaft 111, and a reluctance sensor for sensing when a tooth of the pick-up wheel passes by the reluctance sensor.

The controller may receive signals representing various generator parameters from various generator sensors. The generator parameters can include a dc-link voltage, a dc-link current, a generator field voltage, a generator field current, a generator output voltage, and a generator output current. Other generator parameters may be possible as well, in accordance with various embodiments. Correspondingly, the controller may control the vehicle system by sending commands to various components such as traction motors, alternator, cylinder valves, throttle, etc. Signals from generator sensors 170 may be bundled together into one or more wiring harnesses to reduce space in vehicle system 100 devoted to wiring and to protect the signal wires from abrasion and vibration. The controller may also receive signals from an alternator voltage sensor and/or an engine shaft torque sensor.

The controller may include onboard electronic diagnostics for recording operational characteristics of the engine. Operational characteristics may include measurements from sensors 160 and 170, for example. In one embodiment, the operational characteristics may be stored in a database in memory 154. In one embodiment, current operational characteristics may be compared to past operational characteristics to determine trends of engine performance.

The controller may include onboard electronic diagnostics for identifying and recording potential degradation and failures of components of vehicle system 100. For example, when a potentially degraded component is identified, a diagnostic code may be stored in memory 154. In one embodiment, a unique diagnostic code may correspond to each type of degradation that may be identified by the controller. For example, a first diagnostic code may indicate a problem with cylinder 1 of the engine, a second diagnostic code may indicate a problem with cylinder 2 of the engine, a third diagnostic code may indicate a problem with one of the auxiliary systems, etc.

The controller may be further linked to display 180, such as a diagnostic interface display, providing a user interface to the locomotive operating crew and a maintenance crew. The controller may control the engine, in response to operator input via user input controls 182, by sending a command to correspondingly adjust various engine actuators 162. Non-limiting examples of user input controls 182 may include a throttle control, a braking control, a keyboard, and a power switch. Further, operational characteristics of the engine and auxiliary equipment, such as diagnostic codes corresponding to degraded components, may be reported via display 180 to the operator and/or the maintenance crew.

The vehicle system may include a communications system 190 linked to the controller. In one embodiment, communications system 190 may include a radio and an antenna for transmitting and receiving voice and data messages. For example, data communications may be between the vehicle system and a control center of a railroad, another locomotive, a satellite, and/or a wayside device, such as a railroad switch. For example, the controller may estimate geographic coordinates of the vehicle system using signals from a GPS receiver. As another example, the controller may transmit operational characteristics of the engine and/or auxiliary equipment to the control center via a message transmitted from communications system 190. In one embodiment, a message may be transmitted to the command center by communications system 190 when a degraded component of the engine or auxiliary equipment is detected, and the vehicle system may be scheduled for maintenance.

Figure 2:
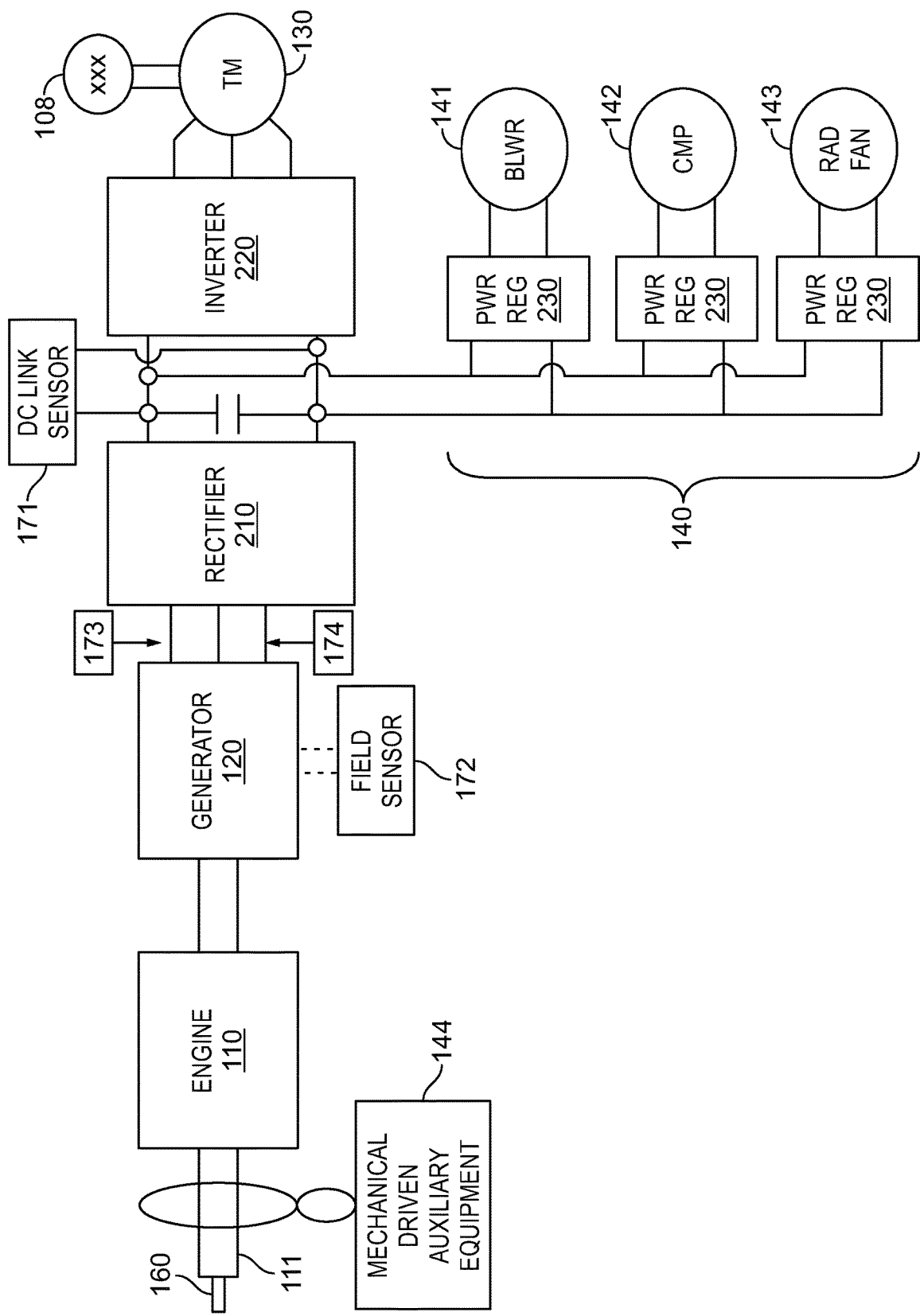
FIG. 2 shows an embodiment of the engine and generator of FIG. 1 operatively connected to various auxiliary equipment and traction motors.

FIG. 2 is an illustration of an embodiment of the engine 110 and generator 120 of FIG. 1 operatively connected to various auxiliary equipment 140 (141, 142, 143, 144) and traction motors 130. Various mechanical auxiliary equipment 144 may be operatively coupled to and driven by the rotating engine shaft 111. Other auxiliary equipment 140 are driven by the generator 120 through a rectifier 210 that produces a dc-link voltage to power regulators 230. Examples of such auxiliary equipment include a blower 141, a compressor 142, and a radiator fan 143, an alternator, etc. The traction motors 130 are driven by the generator 120 through the rectifier 210 that produces a dc-link voltage to an inverter 220. In accordance with certain embodiments, the generator 120 may actually be one or more generators such as, for example, a main generator to drive the traction motors 130 and an auxiliary generator to drive a portion of the auxiliary equipment 140. Further examples of auxiliary equipment include turbochargers, pumps, and engine cooling systems.

The speed sensor 160 measures the speed of the rotating shaft 111 of the engine during operation. The dc-link sensor 171 is a generator sensor and can measure dc-link voltage, dc-link current, or both, in accordance with various embodiments. The field sensor 172 is a generator sensor and can measure field current of the generator, field voltage of the generator, or both, in accordance with various embodiments. In accordance with certain embodiments, generator sensors 173 and 174 are provided for measuring the armature output voltage and current of the generator, respectively.

In accordance with an embodiment, the frequency content of a generator parameter is used to diagnose a condition of the engine. A generator parameter (e.g., the dc-link voltage) is measured using the dc-link sensor 171 and is sent to the controller 150. Other generator parameters may be used instead, including the dc-link current, the generator field voltage, the generator field current, the generator output voltage, and the generator output current. In other examples, the engine speed and/or engine shaft torque may additionally or alternatively be measured. The controller 150 samples the generator parameter (and/or engine speed and shaft torque) over time and performs a frequency analysis process on the sampled data. In accordance with one embodiment, the frequency analysis process is a Fourier transform process (e.g., a Fast Fourier Transform, FFT, process). In accordance with another embodiment, the frequency analysis process is a bandpass filtering process. The frequency analysis process transforms the sampled time domain generator parameter into frequency content in the frequency domain. The various frequency components of the frequency content can include fundamental (first order) and harmonic (second order, half order, third order, etc.) frequency components. In accordance with an embodiment, the Fourier Transform process and the bandpass filtering process include computer executable instructions that are executed by the processor 152. The frequency transformation can be performed on processed/derived signals such as, for example, kilovolt-amps (kVA) or kilowatts (kW) which are the product of current and voltage, or torque which is kW/frequency of the signal.

For example, the engine may have a plurality of cylinders that fire in a predefined sequence, where each cylinder fires once during a four stroke or a two stroke cycle. For example, a four cylinder, four stroke engine may have a firing sequence of 1-3-4-2, where each cylinder fires once for every two revolutions of the engine. Thus, the firing frequency of a given cylinder is one half the frequency of revolution of the engine and the firing frequency of the engine (e.g., where any one of the cylinders of the engine is firing) is twice the frequency of revolution of the engine. The frequency of revolution of the engine may be described as the first engine order. Such a first order frequency component can show up in the frequency content of the measured generator parameter. The firing frequency of a given cylinder of a four stroke engine may be described as the half engine order, where the half engine order is one half the frequency of revolution of the engine. Such a half order frequency component can also show up in the frequency content of the measured generator parameter.

As another example of a four stroke engine, a twelve cylinder engine may have a firing sequence of 1-7-5-11-3-9-6-12-2-8-4-10, where each cylinder fires once for every two revolutions of the engine. Thus, the firing frequency of a given cylinder is one half the frequency of revolution of the engine and the firing frequency of the engine is six times the frequency of revolution of the engine. As an example of a two stroke engine, a twelve cylinder engine may have a firing sequence of 1-7-5-11-3-9-6-12-2-8-4-10, where each cylinder fires once for every revolution of the engine. Thus, the firing frequency of a given cylinder is the frequency of revolution of the engine and the firing frequency of any cylinder is twelve times the frequency of revolution of the engine. Again, these frequency components can show up in the frequency content of the measured generator parameter.

For example, the engine may be a four stroke engine operating at 1050 RPM. Thus, the first engine order is at 17.5 Hz and the half engine order is at 8.75 Hz. The dc-link voltage may vary with a periodic frequency as the engine shaft 111 rotates during operation. For example, the frequency content of the dc-link voltage may include a frequency component at the frequency of the first engine order. In other words, the peak magnitude of the frequency content may occur at the first-order frequency component. The dc-link voltage may also include frequency content at other harmonics of the first-order frequency, such as at a second-order frequency (twice the engine frequency), a third-order frequency (three times the engine frequency), etc. Similarly, the dc-link voltage may include frequency content at frequencies less than the first-order frequency, such as at a half-order frequency (half the engine frequency).

Figure 3:
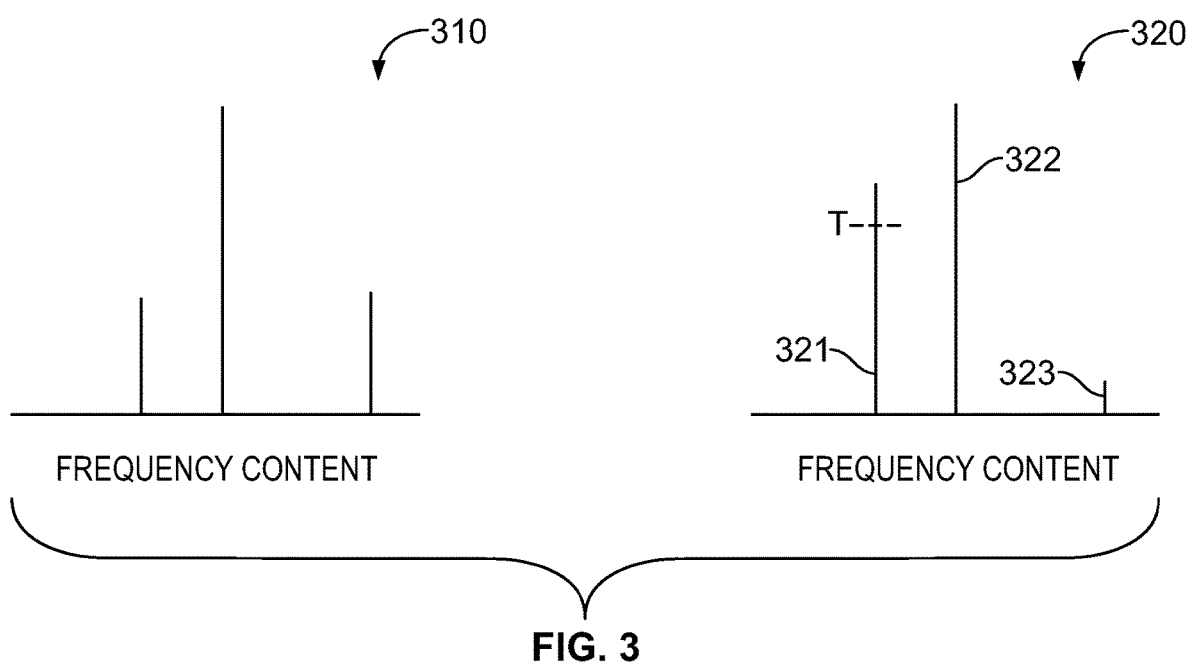
FIG. 3 is a diagram illustrating examples of frequency content of a signal output from a sensor configured to measure a parameter of generator output.

For an engine that is "healthy" and is operating properly, the frequency content of the measured generator parameter can have a particular healthy signature. Deviations from such a healthy signature can indicate a problem with the engine. For example, in accordance with an embodiment, a condition of an engine may be diagnosed by analyzing a half order and/or first order magnitude and/or phase of the frequency content. FIG. 3 is an illustration showing embodiments of "healthy" and "unhealthy" frequency content. The frequency content 310 of the healthy engine (e.g., an engine that is operating properly) has three frequency components of absolute and relative magnitudes as shown in FIG. 3, in accordance with an embodiment. The frequency content 320 of the unhealthy engine (e.g., an engine that is not operating properly due to some degradation or failure) has three frequency components at the same locations as in the frequency content 310 for the healthy engine. However, the amplitude of one frequency component 321 (e.g., a half order component) is distorted (e.g., increased in amplitude), and the amplitude of another frequency component 323 (e.g., a second order component) is also distorted (e.g., decreased in amplitude), in accordance with an embodiment. In one embodiment, the distorted half order component 321 is indicative of an unhealthy engine and is identified by comparing the amplitude of the half order component to a threshold value.

In accordance with another embodiment, both distorted frequency components 321 and 323 in the frequency content 320 are indicative of an unhealthy engine. Furthermore, the particular characteristics of the distorted frequency components (e.g., amplitude) relative to the other frequency components in the frequency content 320 of the unhealthy engine can be indicative of a particular type of engine degradation or failure (e.g., cylinder number 3 of the engine is inoperable). Also, the phase of the half order component, with respect to a reference cylinder (e.g., cylinder number 1), can be used to isolate a problem to a particular cylinder.

The degraded components may cause the engine to operate less efficiently, with less power, and/or with more pollution, for example. Further, the condition of the degraded components may accelerate degradation of the components which may increase the likelihood of catastrophic engine failure and road failure. A degraded engine cylinder is an example of a degraded engine component. Thus, for a four-stroke engine, the distorted frequency component may occur at the half-order frequency. For a two-stroke engine, the distorted frequency component may occur at the first-order frequency. The diagnosis, then, may include both a warning of degradation as well as an indication of the type and/or location of the degraded engine component.

A diagnostic logic in the controller 150 may detect an unhealthy condition in the frequency content of a generator parameter. For example, the half order component 321 may be compared to a threshold level T by the diagnostic logic. If the magnitude of the component 321 exceeds the threshold level T, then the diagnostic logic determines that degradation in the engine has occurred. Furthermore, if the diagnostic logic determines that the ratio of the half order component 321 to the first order component 322 exceeds a second threshold level, and the ratio of the first order component 322 to the second order component 323 exceeds a third threshold level, then the diagnostic logic isolates the degradation to a particular engine component (e.g., cylinder number 3). In accordance with an embodiment, the diagnostic logic includes computer executable instructions that are executed by the processor 152. In accordance with an embodiment, the ratio of a half order component to a dc or zero order component can be indicative of an engine problem. Furthermore, the threshold level T can be dependent on an operating condition of the engine such as, for example, power, speed, ambient conditions, repair history, etc.

Types of engine degradation or failures that can be diagnosed, distinguished, and isolated may include a worn out ignition plug, a fuel imbalance, a faulty cylinder, a knocking in the engine, a low fuel input, a low compression, and a valve train failure, for example. Once a degradation or failure is diagnosed, an action can be taken. Such actions may include, for example, providing a warning signal to the operator (e.g., via the display 180), adjusting an engine operating parameter (e.g., derating the engine power, shutting down at least one cylinder of the engine, shutting down the engine entirely, balancing cylinders of the engine), logging a maintenance action, and transmitting the diagnosed condition to a central location (e.g., via the communications system 190).

Figure 4:
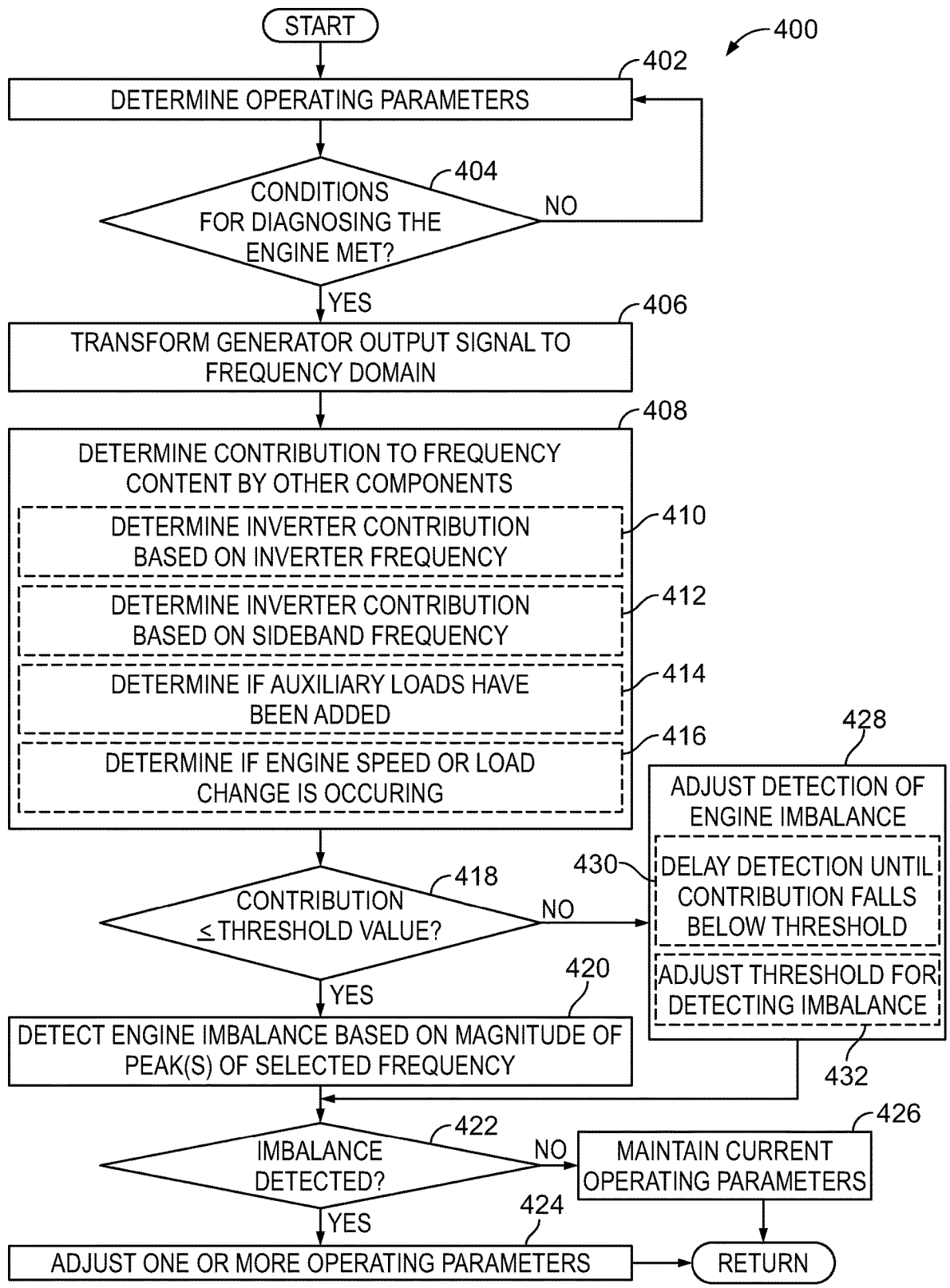
FIG. 4 is a flow chart illustrating a method for diagnosing an engine, according to an embodiment.

Turning now to FIG. 4, a method 400 for diagnosing an engine degradation is presented. Method 400 may be carried out according to instructions stored in memory of a controller, such as controller 150 of FIGS. 1-2 in order to diagnose an engine conditions, such as a misfiring cylinder, based on output from a sensor configured to measure a parameter of generator output, such as DC link sensor 171. If misfire or other engine degradation is detected, method 400 may adjust one or more operating parameters to mitigate the source of degradation, such as adjusting fuel injection amounts to the degraded cylinder. While method 400 is described below with respect to the systems and components of FIGS. 1 and 2, it is to be understood that the imbalance detection may be performed on other engines and other system configurations. For example, the engine may be positioned in a vehicle or stationary platform that includes loads other than traction motors that are driven by the generator. For example, the generator may drive a motor coupled to a propeller, if the vehicle is a marine vessel. Further, rather than including a rectifier and inverters (e.g., to convert AC to DC and back to AC), the vehicle or stationary platform system may supply AC directly to one or more motors or loads. In such examples, a sensor may measure alternating current provided by the generator to the motors or loads (via one or more power conversion components, such as transformers and/or converters, at least in some examples), and the signal from the sensor may be used to detect imbalance in the manner described below.

At 402, method 400 determines engine system operating parameters. The determined operating parameters include, but are not limited, engine speed, engine load, generator load, auxiliary load status, traction motor speed (or other motor speed), and other parameters. At 404, method 400 includes determining if conditions for diagnosing the engine have been met. As explained above with respect to FIGS. 2 and 3, and explained in more detail below, degradation of the engine may be detected based on a parameter of generator output, such as the DC link voltage, AC current on an AC bus, AC bus voltage, etc. For example, the frequency content of the voltage signal output by the DC link voltage sensor may be analyzed to determine if one or more cylinders of the engine are misfiring, hence causing imbalance in the engine shaft rotation and corresponding imbalance in the DC link voltage. To accurately identify imbalance or aberrations in the generator parameter signal, the signal may be analyzed only during conditions where the engine shaft speed is consistent, for example. Thus, at least in one embodiment, the conditions for diagnosing the engine may include engine speed within a range, steady-state operating conditions (e.g., engine speed and/or engine load changing by less than a threshold amount), and/or other conditions.

If the conditions for diagnosing the engine have not been met, method 400 loops back to 402 to continue monitoring operating parameters. If the conditions for diagnosing the engine have been met, method 400 proceeds to 406 to transform the generator output signal (e.g., the DC link voltage signal) into the frequency domain. Transforming the signal may include performing a fast Fourier transform on the signal, bandpass filtering the signal, or other suitable transformation. The frequency content of the signal may include a fundamental (e.g., first order) frequency and harmonics (e.g., the half-order, one and half order, second order, etc.).

At 408, method 400 includes determining a contribution to the frequency content of the generator output signal by other components of the vehicle system. As used herein, "other components" of the vehicle system may include components separate from the engine, such as the inverters, converters, motors, or other reciprocating loads, that in some conditions may contribute to the frequency content of the generator output signal. The "other components" may also include a contribution by the engine that is unrelated to engine imbalance, such as an increase in engine load. Under select conditions (e.g., during select modes of operation), one or more components of the engine or of the vehicle in which the engine is installed may contribute to the generator output signal. When the frequency content of the voltage signal is analyzed to detect engine imbalance, for example, imbalance may be indicated if the other components are contributing to the frequency content, thus leading to false positive indications of engine imbalance or other types of degradation. Because detection of engine imbalance may lead to engine operating adjustments, including adjustment of fuel injection amounts, and in some cases may lead to engine shutdown, false positive indications of imbalance may be costly, time consuming, waste fuel, or have other consequences. Thus, as explained herein, the contribution of the other components to the frequency content may be detected, and if the contribution is above a threshold, the detection of the imbalance may be adjusted to compensate for the contribution by the other components.

One component that may contribute to the frequency content of generator output signal is an inverter. As explained above with respect to FIG. 2, an inverter is coupled between the rectifier and one or more traction motors, and acts to invert the DC voltage from the rectifier. In one example, the DC link voltage signal may be effected by the inverter base frequency. Accordingly, determining the contribution to the frequency content by another component of the vehicle includes, at 410, determining the contribution of one or more inverters based on the inverter frequency. The inverter frequency may be estimated based on the locomotive speed and/or traction motor speed. If the inverter frequency is within a threshold of the engine frequency, it may be determined that the one or more inverters are contributing to the frequency content of the DC link voltage signal. As such, when the inverter frequency is at or near the engine frequency (e.g., if the inverter frequency is within 0.5 or 1 Hz of the engine frequency), the contribution to the frequency content by the inverters may be above a threshold value.

In another example, as indicated at 412, the contribution by the one or more inverters may be determined based on one or more sideband frequencies of the engine frequency. When an engine imbalance occurs, the magnitude of the half-order frequency component of the frequency content of the generator output (e.g., voltage) increases. However, this effect on the generator output is relatively narrow-spectrum, and thus only the half-order frequency may be affected by the imbalance. In contrast, the one or more inverters (as well as other components that contribute to the frequency content) may affect the generator output in a relatively wide-spectrum manner, e.g., the contribution by the inverters is not limited to the half-order frequency. Thus, to detect the contribution to the frequency content by the inverters, the sidebands of one or more selected frequency components may be analyzed. If the sidebands are greater than a threshold, then if may be indicated that the contribution by the inverters is greater than a threshold value.

In an example, the engine may be operating at 1050 RPM, and thus the engine frequency (e.g., the engine revolution frequency) is 17.5 Hz, giving a half-order frequency of 8.75 Hz. The main peak of the half-order frequency component may be identified as a band around 8.75, such as 8.5-9, and the sidebands may be identified as frequency bands adjacent to the main peak, such as a first side band of 8-8.5, a second side band of 9-9.5, a third sideband of 7.5-8, and a fourth sideband of 9.5-10. The magnitude of each sideband may be determined, and each sideband magnitude may be summed. The sum of the magnitudes of the sidebands may be compared to a threshold magnitude. In one example, the threshold magnitude may be one-half the threshold magnitude used to determine engine imbalance (explained below). If the summed sideband magnitude is greater than the threshold, it may be indicated the inverters are contributing to the frequency content.

Other components in addition to the inverters may contribute to the frequency content of the generator output signal, including generator auxiliary loads, motors, motor loads (e.g., a propeller), converters, as well as fluctuations in the engine itself. Thus, as indicated at 414, determining the contribution to the frequency content by the other components may include determining if any auxiliary loads have been added during the duration of the sampling and transforming of the generator output signal. The auxiliary loads may include the blower, compressor, radiator fan, additional alternator, or other component that is powered by the generator and/or contributes to the generator load or generator output signal. If an auxiliary component (e.g., the blower, compressor, or radiator fan) is activated during the diagnosis, or if the load placed on the generator by the auxiliary component changes or cycles at frequency that is the same or a multiple of the engine frequency, it may be indicated that the auxiliary load is contributing to the generator output signal. Further, as indicated at 416, determining the contribution to the frequency content by another component may include determining if an engine speed or load change is occurring or has occurred during the sensor sampling or transformation period. If the engine speed or load changes, it may result in a change in engine shaft speed, thus affecting the generator output signal. Other sources of contribution to the generator output signal frequency content are possible. For example, if a motor powered by the generator is coupled to and configured to drive a propeller, the propeller speed (e.g., frequency) and/or pitch may affect the generator output signal frequency content. Similar to the contribution made by the inverter described above, the contribution from the propeller may be considered to be above the threshold if the motor frequency of the motor coupled to the propeller is within a threshold of the engine frequency, which may be determined based on propeller speed and/or pitch.

At 418, method 400 includes determining if the contribution to the frequency content by the other components is less than or equal to a threshold value. In some examples, the threshold value may be zero, such that any contribution is determined to be above the threshold value. In other examples, the threshold may be greater than zero, so that a small amount of contribution to the frequency content is deemed acceptable. It is to be understood that in some examples, the threshold value may not be numeric but instead may be a yes or no determination (e.g., if an engine load change is occurring, the contribution may be determined to be above the threshold). Further, in some examples, the threshold value may depend on the type of component contributing to the frequency content, e.g., the inverter contribution may be deemed greater than the threshold when the sideband frequency magnitudes are greater than a threshold magnitude while the auxiliary load contribution may be deemed greater than the threshold when an auxiliary load is added.

If the contribution is determined to be less than or equal to the threshold, method 400 proceeds to 420 to detect engine imbalance based on the magnitude of a peak of a selected frequency. In one example, the main peak of the half-order frequency component may be analyzed (e.g., the peak corresponding to the half-order frequency of the engine), and if the magnitude is greater than a threshold magnitude, engine imbalance may be indicated. However, other frequency components (e.g., first order, second order) may be analyzed, either alone or in combination. Other mechanisms for detecting engine imbalances based on the generator output signal frequency content are possible.

Further, as explained above, rather than analyzing a single, main peak corresponding to a selected frequency component, a bucket including multiple frequencies around the selected frequency component may be analyzed, such as the frequency components in the 8.5-9 Hz range. When more than one peak is analyzed to determine imbalance, the peaks may be summed or averaged and then compared to a threshold. In one example, the mean frequency bucket sum of RMS square is compared to an imbalance threshold, and if the mean frequency bucket is greater than the imbalance threshold, imbalance may be determined. Likewise, when the sideband frequency content is analyzed to determine if the inverters or other components are contributing to the signal content, the sideband frequency bucket sum of RMS square is compared to a threshold, which in some examples may be one-half the imbalance threshold.

At 422, method 400 determines if imbalance is detected. If imbalance is detected, method 400 proceeds to 424 to adjust one or more engine operating parameters to mitigate the imbalance. The adjusting of the engine operating parameters may include adjusting a fuel injection amount to a cylinder that is determined to be misfiring (e.g., if the engine is a multi-fuel engine configured to combust gaseous and liquid fuel, the amount of liquid fuel relative to gaseous fuel may be increased in the misfiring cylinder), or all cylinders of the engine. Other engine adjustments may include adjusting fuel injection or ignition timing, valve timing, exhaust gas recirculation, boost pressure, or other parameters. Further, depending on the level of imbalance and whether it can be mitigated via engine parameter adjustments, the engine power may be derated or the engine may be shut down in some examples. Method 400 then returns.

If is determined at 422 that no imbalance is detected, method 400 proceeds to 426 to maintain current operating parameters, including maintaining fuel injection parameters (e.g., amounts, timing). Method 400 then returns.

Returning to 418, if is determined than the contribution is not less than or equal to the threshold, method 400 proceeds to 428 to adjust the detection of the engine imbalance. This may include delaying the detection until the contribution drops below the threshold, as indicated at 430. As the sources that contribute to the frequency content are typically transient, the detection of the engine imbalance may be delayed (e.g., by a predetermined amount of time or number of engine cycles) until the component is no longer contributing to the frequency content of the generator output signal. In another example, the adjusting of the detection of engine imbalance may include adjusting a threshold used in the imbalance determination, as indicated at 432. As explained above at 420, engine imbalance may be indicated when the half-order frequency component (e.g., 8.75 Hz for an engine at 1050 RPM, or a mean or sum of a bucket of frequencies around a selected frequency component) is greater than a threshold magnitude (e.g., the magnitude predicted for a healthy engine). When the contribution to the frequency content by another component in the vehicle is greater than the threshold contribution value (e.g., the inverters are operating at a frequency near the engine frequency), this threshold magnitude used for determining imbalance may be increased to reduce the number of false positive imbalance detections. In this way, while more subtle engine imbalances may go undetected, at least for a duration, stronger imbalances may be detected without unnecessarily adjusting engine parameters or shutting down the engine due to false indications of imbalance. Method 400 then returns.

Thus, engine imbalance may be detected via generator output. For example, if a fuel injector is faulty or the intake or exhaust valves are degraded, incomplete combustion may occur, and hence a lower combustion torque may be produced. The sum total of these combustion torques is seen by the generator, and the generator produces an electromagnetic torque whose profile matches with the engine shaft torque. Using the generator as a sensor, faults in the system may be identified without the use of additional sensors. However, the generator output (such as the DC link voltage) sees interference from a variety of other sources including inverters, auxiliaries, alternators, engine speed shaft oscillations due to sudden load, capacitor failures, etc. These potential sources of noise may be identified and addressed to help improve the fidelity of the imbalance determination and eliminate false positives. For removing interference from the inverters, sideband frequencies may be evaluated, and those signals may be eliminated when the values are beyond a threshold.

Further, in some examples, the method described above may be applied to output from other engine system sensors, such as engine speed sensors, alternator voltage sensors, or engine shaft torque sensors. Therein, sources of noise to the sensor output may be identified (e.g., inverter operation, sudden engine load changes, engagement or disengagement of auxiliary loads, etc.) and the detection of engine imbalance may be delayed until the contribution to the sensor output frequency content is below a threshold, or the engine imbalance detection may be adjusted (e.g., the threshold magnitude for indicating imbalance may be increased). For example, the inverters may contribute to a signal output by an engine shaft torque sensor, and if this contribution is determined to be above a threshold, the engine imbalance detection may be delayed, or the threshold magnitude used to determine if engine imbalance is present may be increased.

Figure 5:
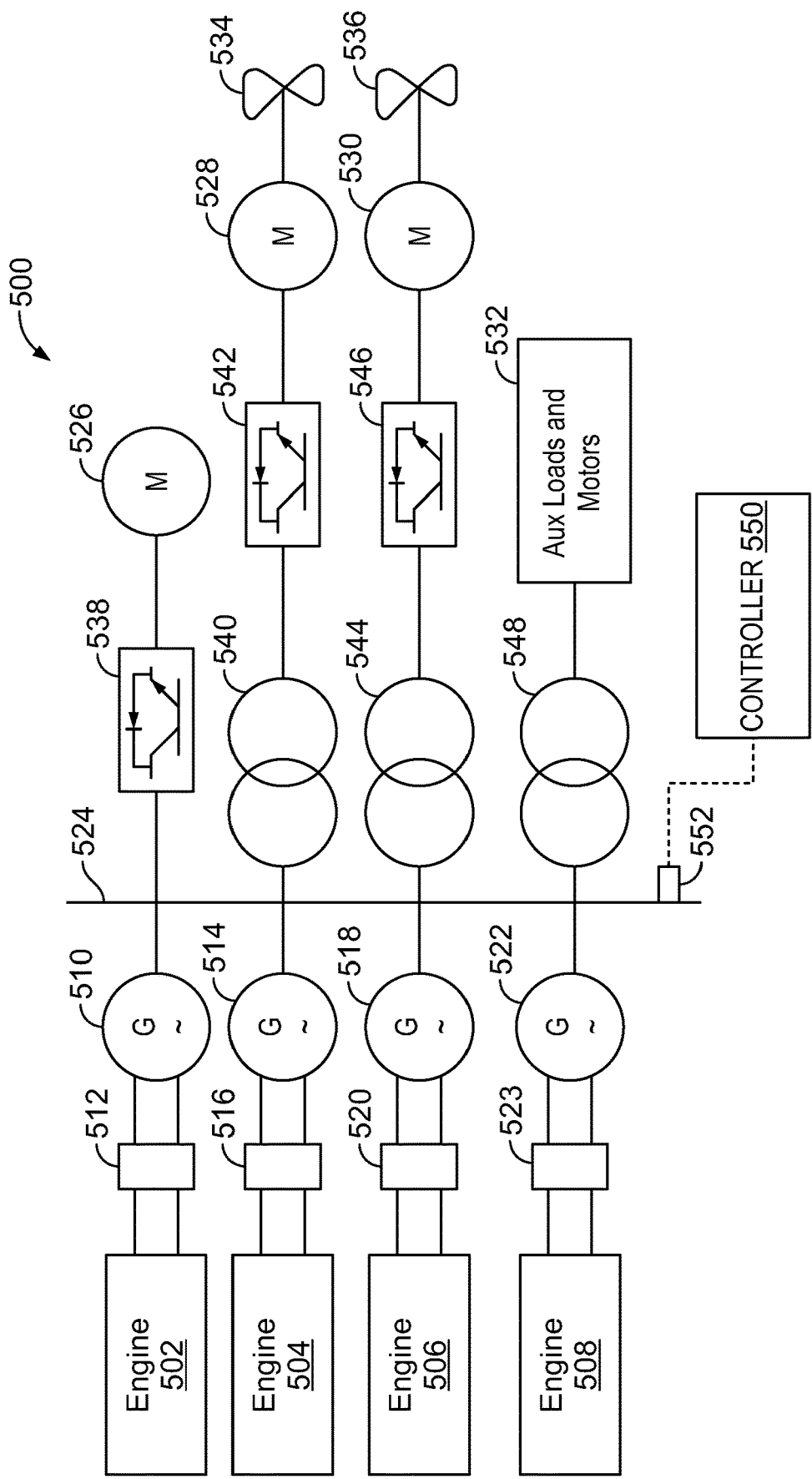
FIGS. 5-9 show various engine system configurations according to embodiments of the disclosure.

Turning to FIG. 5, a first configuration of an engine system 500 according to an embodiment of the disclosure is shown. Engine system 500 may be installed in a vehicle, such as a marine vessel or other suitable vehicle. In other examples, engine system 500 may be installed in a stationary platform where the engines described below generate electricity via the coupled generators in order to power various loads.

Engine system 500 includes a plurality of engines. As shown, engine system 500 includes a first engine 502, a second engine 504, a third engine 506, and a fourth engine 508. Each engine of engine system 500 may be non-limiting examples of engine 110 of FIG. 1, and thus description of engine 110 provided above with respect to FIGS. 1 and 2 likewise applies to the engines of engine system 500.

Each engine is coupled to a respective generator via a respective engine shaft, similar to the engine-generator coupling described above with respect to FIGS. 1 and 2. Accordingly, a first generator 510 is coupled to first engine 502 via a first engine shaft 512, a second generator 514 is coupled to second engine 504 via a second engine shaft 516, a third generator 518 is coupled to third engine 506 via a third engine shaft 520, and a fourth generator 522 is coupled to fourth engine 508 via a fourth engine shaft 523. Each generator is configured to generate electricity via rotation of the respective engine shaft. The electricity generated by the generators is used to power one or more loads, which will be explained in more detail below, via a common bus 524. In the example shown in FIG. 5, common bus 524 is an AC bus configured to carry alternating current.

Common bus 524 is coupled to a plurality of loads and is configured to supply electricity to each of the coupled loads as demanded. In engine system 500, common bus 524 is coupled to a first motor 526, a second motor 528, a third motor 530, and additional loads 532. Second motor 528 is coupled to a first propeller 534 and third motor 530 is coupled to a second propeller 536. While not shown in FIG. 5, first motor 526 may be coupled to a suitable load, such as a blower, compressor, or other driven component. The additional loads 532 may include hoteling loads (e.g., lights, cabin power, etc.), alternators, energy storage devices, compressors, blowers, or other driven loads.

Each of the loads of engine system 500 (e.g., first motor 526, second motor 528, third motor 530, and additional loads 532) may be coupled to common bus 524 via respective power conversion components. The power conversion components are electrical power conversion components and may act to increase or decrease voltage supplied to the respective loads, convert or invert the current (e.g., from AC to DC or vice versa) or otherwise control or regulate the electricity provided to each load. As shown in FIG. 5, first motor 526 may be coupled to common bus 524 via a first converter 538. Second motor 528 may be coupled to common bus 524 via a first transformer 540 and a second converter 542. Third motor 530 may be coupled to common bus 524 via a second transformer 544 and a third converter 546. Additional loads 532 may be coupled to common bus 524 via third transformer 548.

Engine system 500 includes a controller 550. Controller 550 may be similar to controller 150 of FIG. 1 and thus include one or more processors and memory. Controller 550 may store instructions in memory executable by the one or more processors to carry out the methods described herein. Further, controller 550 is operably coupled to a generator output sensor 552. Generator output sensor 552 is positioned to measure a parameter of generator output carried on common bus 524. For example, generator output sensor 552 may measure a current carried on common bus 524 or a voltage supplied via common bus 524. Due to common bus 524 being coupled to each generator, current or voltage measured by generator output sensor 552 may be representative of the output of each generator. The signal from generator output sensor 552 may be used by controller 550 in order to determine if one or more of the engines of engine system 500 is exhibiting imbalance, in a manner similar to the engine imbalance detection described above with respect to FIG. 4.

For example, during steady state conditions where the speed of each engine of engine system 500 is not changing, the output from generator output sensor 552 may be sampled to generate a generator output signal. The generator output signal may be analyzed to determine the frequency content of the generator output signal (e.g., a Fourier transform may be performed on the generator output signal). The frequency content may be analyzed to determine if one or more engines is exhibiting imbalance. However, because multiple generators are coupled to the same bus, multiple frequencies each determined based on a speed of a respective engine may be selected and the respective magnitude of each frequency compared to a threshold. For example, if each engine is operating at a different engine speed, each generator will contribute to the frequency content of the generator output signal in a different manner. If first engine 502 is operating at 1050 RPM and second engine 504 is operating at 1200 RPM, the half order frequency component of the contribution to the generator output signal from first generator 510 (e.g., 8.75 Hz) will be different than the half order frequency component of the contribution to the generator output signal from second generator 514 (e.g., 10 Hz). Thus, to detect imbalance of first engine 502, the magnitude of the frequency component at 8.75 Hz may be compared to threshold. To detect imbalance of second engine 504, the magnitude of the frequency component at 10 Hz may be compared to a threshold. In this way, imbalance of multiple engines may be diagnosed with a single generator output signal.

However, if one or more engines are operating at substantially similar engine speeds, engine imbalance may be detectable, but the controller may not be able to identify which engine is exhibiting the imbalance. For example, if both first engine 502 and second engine 504 are operating at 1050 RPM, the magnitude of the frequency component at 8.75 Hz may be compared to a threshold. If imbalance is detected based on the magnitude relative to the threshold, the controller may not identify which engine is exhibiting imbalance. As such, during a subsequent operating period where only one of first engine 502 and second engine 504 is operating, the imbalance detection may be repeated. In this way, if imbalance is detected, the operating engine may be identified as exhibiting the imbalance. If imbalance is not detected, the non-operating engine may be identified as exhibiting the imbalance.

In another example, the imbalance detection may be carried out when one or more engines are not operating in order to facilitate isolation of the various generators' contributions to the frequency content of the generator output signal. For example, during certain conditions where output from each engine is not required to meet load power demand (e.g., slow vehicle speed), each engine may be sequentially shut off. When an engine is off, the imbalance detection may be executed as described above (e.g., the frequency content of the generator output signal may be analyzed). The imbalance detection may be performed each time an engine is shut off.

Further, various components of engine system 500 may contribute to the generator output signal. As described above with respect to FIG. 4, if these contributions affect the imbalance detection (e.g., by overlapping with one or more engine frequencies or otherwise contributing to the selected frequencies analyzed in the imbalance detection), the imbalance detection may be adjusted by delaying the imbalance detection, adjusting a threshold magnitude that a frequency magnitude is compared to, shutting off or changing a speed of a component (e.g. an engine may be shut off), or other adjustment. The power conversion components may contribute to the generator output signal. Likewise, the motors may be contributing to the generator output signal. The loads driven by the electricity generated by the generators may contribute to the generator output signal (e.g., the propellers). Additional details of the imbalance detection and identification of the components contributing to the frequency content of the generator output signal will be provided below with respect to FIGS. 10A and 10B.

While engine system 500 was described above as including two propellers, in some examples engine system 500 may not be a marine vessel, and thus the propellers may be omitted and instead the second and third motors may drive different loads (e.g., traction wheels). Further, in some examples one or more of the motors of engine system 500 may be replaced with other loads. Further still, additional or alternative power conversion components may be present in engine system 500 that are not illustrated in FIG. 5, such as inverters, additional converters, rectifiers, or the like. Further still, more or fewer engines may be present in engine system 500.

Figure 6:
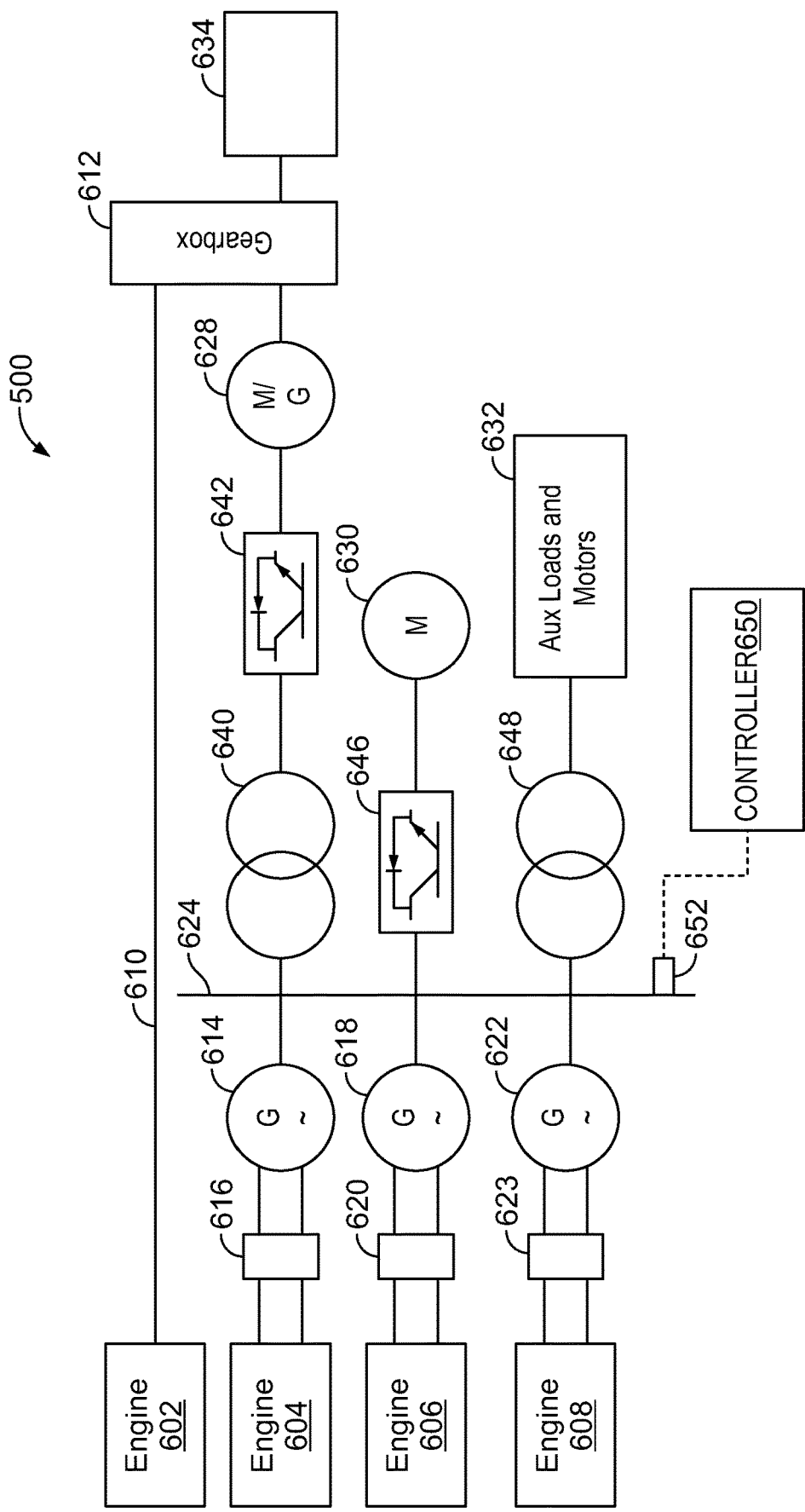

FIG. 6 shows a second configuration of an engine system 600. Engine system 600 may be installed in a vehicle, such as a marine vessel or other suitable vehicle. In other examples, engine system 600 may be installed in a stationary platform where the engines described below generate electricity via the coupled generators in order to power various loads.

Similar to engine system 500, engine system 600 includes a plurality of engines. As shown, engine system 600 includes a first engine 602, a second engine 604, a third engine 606, and a fourth engine 608. Each engine of engine system 600 may be non-limiting examples of engine 110 of FIG. 1, and thus description of engine 110 provided above with respect to FIGS. 1 and 2 likewise applies to the engines of engine system 600.

Three of the engines of engine system 600 are coupled to a respective generator via a respective engine shaft, similar to the engine-generator coupling described above with respect to FIG. 5. Accordingly, a first generator 614 is coupled to second engine 604 via a second engine shaft 616, a second generator 618 is coupled to third engine 606 via a third engine shaft 620, and a third generator 622 is coupled to fourth engine 608 via a fourth engine shaft 623. Each generator is configured to generate electricity via rotation of the respective engine shaft. The electricity generated by the generators is used to power one or more loads, which will be explained in more detail below, via a common bus 624. In the example shown in FIG. 6, common bus 624 is an AC bus configured to carry alternating current.

Common bus 624 is coupled to a plurality of loads and is configured to supply electricity to each of the coupled loads as demanded. In engine system 600, common bus 624 is coupled to a first motor/generator 628, a second motor 630, and additional loads 632. First motor/generator 628 is coupled to a propeller 534. While not shown in FIG. 6, second motor 630 may be coupled to a suitable load, such as a blower, compressor, or other driven component. The additional loads 632 may include hoteling loads (e.g., lights, cabin power, etc.), alternators, energy storage devices, compressors, blowers, or other driven loads.

Each of the loads of engine system 600 (e.g., first motor/generator 628, second motor 630, and additional loads 632) may be coupled to common bus 624 via respective power conversion components. The power conversion components are electrical power conversion components and may act to increase or decrease voltage supplied to the respective loads, convert or invert the current (e.g., from AC to DC or vice versa) or otherwise control or regulate the electricity provided to each load. As shown in FIG. 6, first motor/generator 628 may be coupled to common bus 624 via a first transformer 640 and a first converter 642. Second motor 630 may be coupled to common bus 624 via a second converter 646. Additional loads 632 may be coupled to common bus 624 via third transformer 648.

Unlike engine system 500, in engine system 600, one of the engines is mechanically coupled to one of the loads, herein propeller 634. Thus, as shown, first engine 602 is mechanically coupled via a first engine shaft 610 to propeller 634. In this way, rotation of the engine shaft 610 of first engine 602 drives propeller 634. A gearbox 612 may selectively couple and uncouple first engine shaft 610 from propeller 634. Gearbox 612 may also selectively couple and uncouple motor/generator 628 from propeller 634. By doing so, propeller 634 may be driven by first engine 602, motor/generator 628, or both, depending on operating conditions. Further, during deceleration/braking events, rotation of propeller 634 may be translated to electricity via motor/generator 628.

Engine system 600 includes a controller 650, which is similar to controller 550 and thus include one or more processors and memory. Controller 650 may store instructions in memory executable by the one or more processors to carry out the methods described herein. Further, controller 650 is operably coupled to a generator output sensor 652, which is positioned to measure a parameter of generator output carried on common bus 624 (e.g., current or voltage). The signal from generator output sensor 652 may be used by controller 650 in order to determine if one or more of the engines of engine system 600 that is coupled to common bus 624 is exhibiting imbalance, in a manner similar to the engine imbalance detection described above with respect to FIG. 4 and/or in a manner similar to the imbalance detection described above with respect to FIG. 5. However, because first engine 602 is not coupled to common bus 624, imbalance in first engine 602 may be detected via an alternate imbalance detection method (e.g., by analyzing the frequency content of the engine shaft speed sensor coupled to first engine 602).

As explained above with respect to FIG. 5, various components of engine system 600 may contribute to the generator output signal, such as the power conversion components, the motors, the loads driven by the electricity generated by the generators (e.g., the propeller). Additional details of the imbalance detection and identification of the components contributing to the frequency content of the generator output signal will be provided below with respect to FIGS. 10A and 10B.

While engine system 600 was described above as including a propeller, in some examples engine system 600 may not be a marine vessel, and thus the propeller may be omitted and instead the second motor and first engine may drive different loads (e.g., traction wheels). Further, in some examples one or more of the motors of engine system 600 may be replaced with other loads. Further still, additional or alternative power conversion components may be present in engine system 600 that are not illustrated in FIG. 6, such as inverters, additional converters, rectifiers, or the like. Additionally, in some examples, engine system 600 may include fewer or more engines than illustrated in FIG. 6.

Figure 7:
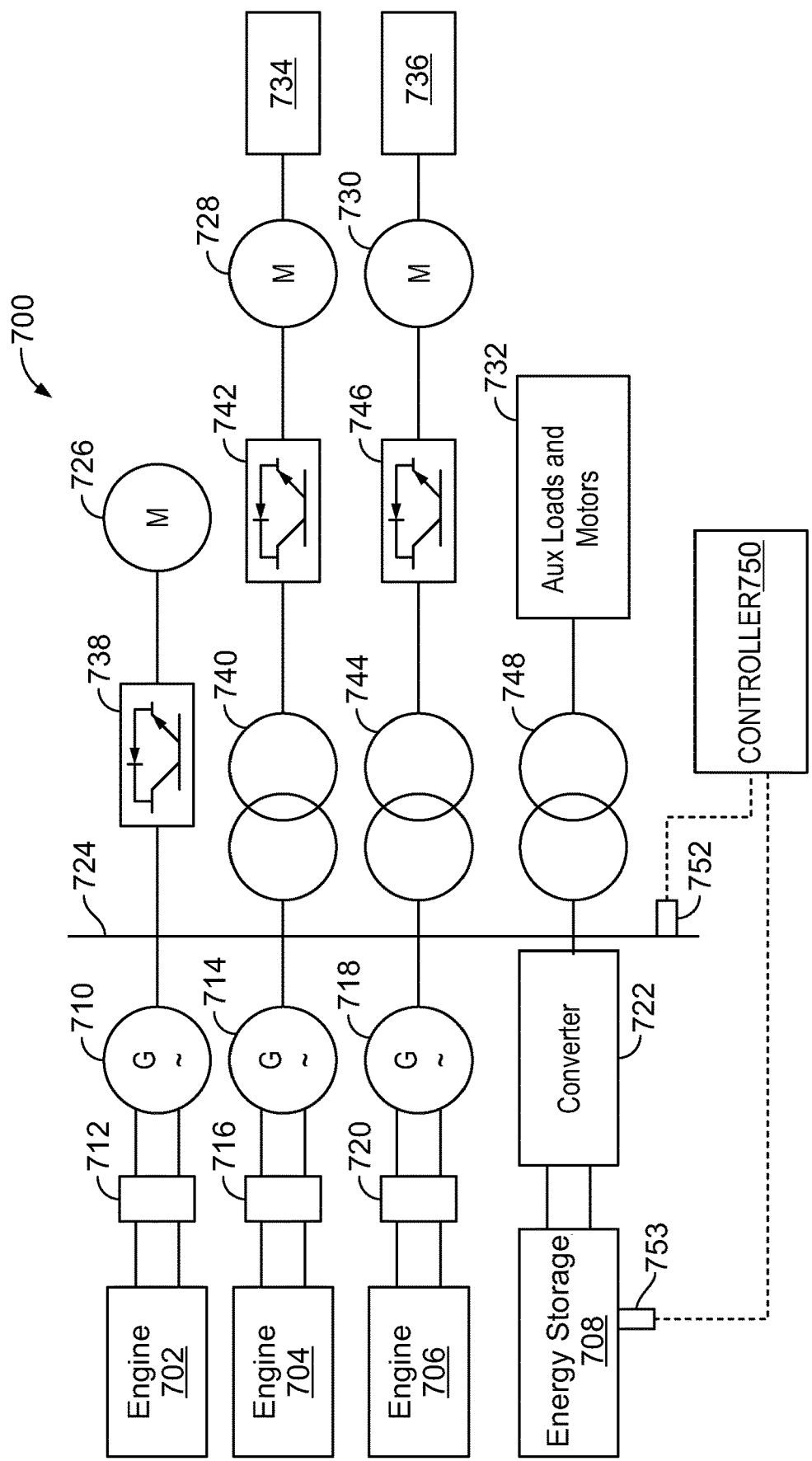

FIG. 7 shows a third configuration of an engine system 700. Engine system 700 may be installed in a vehicle, such as a marine vessel or other suitable vehicle. In other examples, engine system 700 may be installed in a stationary platform where the engines described below generate electricity via the coupled generators in order to power various loads.

Engine system 700 is similar to engine system 500, and thus includes a plurality of engines and corresponding generators that generate electricity that is supplied to a plurality of loads via a common bus. However, engine system 700 includes only three engines and further includes an energy storage device that may supply electricity to power the loads via the common bus. Accordingly, as shown, engine system 700 includes a first engine 702, a second engine 704, and a third engine 706. Each engine of engine system 700 may be non-limiting examples of engine 110 of FIG. 1, and thus description of engine 110 provided above with respect to FIGS. 1 and 2 likewise applies to the engines of engine system 700.

Each engine is coupled to a respective generator via a respective engine shaft, similar to the engine-generator coupling described above with respect to FIGS. 1 and 2. Accordingly, a first generator 710 is coupled to first engine 702 via a first engine shaft 712, a second generator 714 is coupled to second engine 704 via a second engine shaft 716, and a third generator 718 is coupled to third engine 706 via a third engine shaft 720. Each generator is configured to generate electricity via rotation of the respective engine shaft. The electricity generated by the generators is used to power one or more loads, which will be explained in more detail below, via a common bus 724. In the example shown in FIG. 7, common bus 724 is an AC bus configured to carry alternating current.

Energy storage device 708 may include one or more batteries, capacitors or super capacitors, or other suitable energy storage devices. Energy storage device 708 may be coupled to common bus 724 via a converter 722, which may adjust the voltage output by energy storage device 708 (e.g., switch the current from DC to AC, decrease the voltage, or other power conversion) so that energy storage device 708 may supply electricity to common bus 724. Energy storage device 708 may be charged via common bus 724 during light load operation where full output from each engine is not required to meet system power demands and/or during deceleration or braking events where rotation of the propellers may be converted to electricity to charge energy storage device 708. Then, during high load operation where the engines are unable to meet system power demand, energy from energy storage device 708 may be supplied to common bus 724 to provide additional power to power the loads described below.

Common bus 724 is coupled to a plurality of loads and is configured to supply electricity to each of the coupled loads as demanded. In engine system 700, common bus 724 is coupled to a first motor 726, a second motor 728, a third motor 730, and additional loads 732. Second motor 728 is coupled to a first propeller 734 and third motor 730 is coupled to a second propeller 736. While not shown in FIG. 7, first motor 726 may be coupled to a suitable load, such as a blower, compressor, or other driven component. The additional loads 732 may include hoteling loads (e.g., lights, cabin power, etc.), alternators, energy storage devices, compressors, blowers, or other driven loads.

Each of the loads of engine system 700 (e.g., first motor 726, second motor 728, third motor 730, and additional loads 732) may be coupled to common bus 724 via respective power conversion components. The power conversion components are electrical power conversion components and may act to increase or decrease voltage supplied to the respective loads, convert or invert the current (e.g., from AC to DC or vice versa) or otherwise control or regulate the electricity provided to each load. As shown in FIG. 7, first motor 726 may be coupled to common bus 724 via a first converter 738. Second motor 728 may be coupled to common bus 724 via a first transformer 740 and a second converter 742. Third motor 730 may be coupled to common bus 724 via a second transformer 744 and a third converter 746. Additional loads 732 may be coupled to common bus 724 via third transformer 748.

Engine system 700 includes a controller 750. Controller 750 may be similar to controller 150 of FIG. 1 and controller 550 of FIG. 5 and thus include one or more processors and memory. Controller 750 may store instructions in memory executable by the one or more processors to carry out the methods described herein. Further, controller 750 is operably coupled to a generator output sensor 752 which is positioned to measure a parameter of generator output carried on common bus 724 (e.g., current or voltage). The signal from generator output sensor 752 may be used by controller 750 in order to determine if one or more of the engines of engine system 700 is exhibiting imbalance, in a manner similar to the engine imbalance detection described above with respect to FIG. 4 and with respect to FIG. 5. Controller 750 is also operably coupled to an energy storage sensor 753 which is configured to measure one or more parameters of energy storage device 708, such as current or voltage being supplied to energy storage device 708 and/or being discharged from energy storage device 708.

Further, various components of engine system 700 may contribute to the generator output signal. As described above with respect to FIGS. 4 and 5, if these contributions affect the imbalance detection (e.g., by overlapping with one or more engine frequencies or otherwise contributing to the selected frequencies analyzed in the imbalance detection), the imbalance detection may be adjusted by delaying the imbalance detection, adjusting a threshold magnitude that a frequency magnitude is compared to, shutting off or changing a speed of a component (e.g. an engine may be shut off), or other adjustment. The power conversion components may contribute to the generator output signal. Likewise, the motors may contribute to the generator output signal. The loads driven by the electricity generated by the generators may contribute to the generator output signal (e.g., the propellers). Additional details of the imbalance detection and identification of the components contributing to the frequency content of the generator output signal will be provided below with respect to FIGS. 10A and 10B.

The signal from energy storage sensor 753 may also be analyzed to determine engine imbalance, in a manner similar to the generator output signal. For example, during certain conditions (such as when energy storage device 708 is being charged via common bus 724), energy storage sensor 753 may be sampled to obtain an energy storage signal. The frequency content of the energy storage signal may be analyzed to detect engine imbalance. By doing so, a more robust detection may be performed (e.g., by detecting imbalance via both the generator output signal and the energy storage signal).

While engine system 700 was described above as including two propellers, in some examples engine system 700 may not be a marine vessel, and thus the propellers may be omitted and instead the second and third motors may drive different loads (e.g., traction wheels). Further, in some examples one or more of the motors of engine system 700 may be replaced with other loads. Further still, additional or alternative power conversion components may be present in engine system 700 that are not illustrated in FIG. 7, such as inverters, additional converters, rectifiers, or the like. Additionally, engine system 700 may include more or fewer engines than illustrated in FIG. 7.

Figure 8:
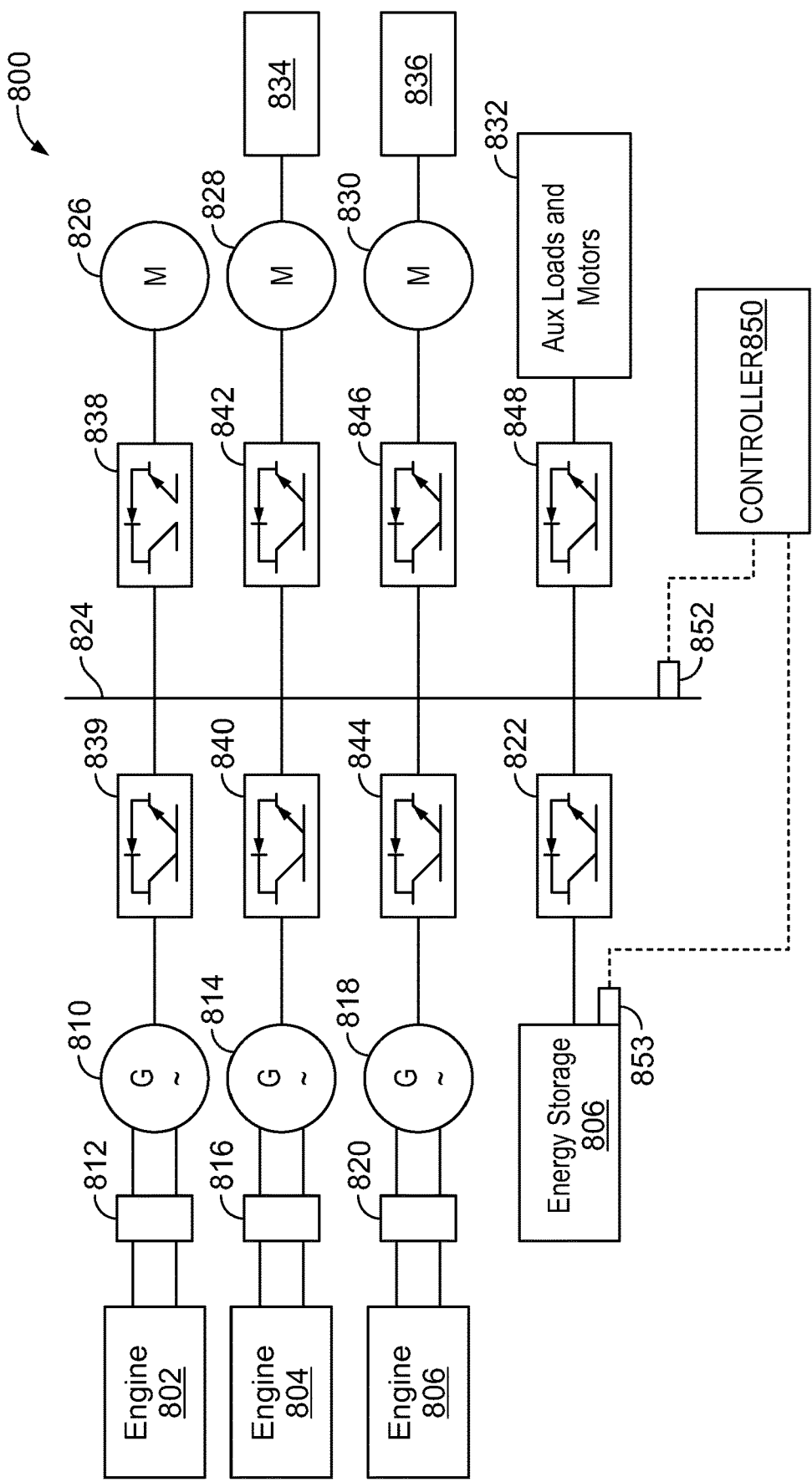

FIG. 8 shows a fourth configuration of an engine system 800. Engine system 800 may be installed in a vehicle, such as a marine vessel or other suitable vehicle. In other examples, engine system 800 may be installed in a stationary platform where the engines described below generate electricity via the coupled generators in order to power various loads.

Engine system 800 is similar to engine system 700 of FIG. 7, and thus includes a plurality of engines and corresponding generators that generate electricity that is supplied to a plurality of loads via a common bus, and also includes an energy storage device that may supply electricity to power the loads via the common bus. However, in engine system 800, the common bus carries direct current. Accordingly, as shown, engine system 800 includes a first engine 802, a second engine 804, and a third engine 806. Each engine of engine system 800 may be non-limiting examples of engine 110 of FIG. 1, and thus description of engine 110 provided above with respect to FIGS. 1 and 2 likewise applies to the engines of engine system 800.

Each engine is coupled to a respective generator via a respective engine shaft, similar to the engine-generator coupling described above with respect to FIGS. 1 and 2. Accordingly, a first generator 810 is coupled to first engine 802 via a first engine shaft 812, a second generator 814 is coupled to second engine 804 via a second engine shaft 816, and a third generator 818 is coupled to third engine 806 via a third engine shaft 820. Each generator is configured to generate electricity via rotation of the respective engine shaft. The electricity generated by the generators is used to power one or more loads, which will be explained in more detail below, via a common bus 824. In the example shown in FIG. 8, common bus 824 is a DC bus configured to carry direct current.

Energy storage device 808 may include one or more batteries, capacitors or super capacitors, or other suitable energy storage devices. Energy storage device 808 may be coupled to common bus 824 via a converter 822, which may adjust the current output by energy storage device 808 (e.g., switch the current from AC to DC, decrease the voltage, or other power conversion) so that energy storage device 808 may supply electricity to common bus 824. Energy storage device 808 is similar to energy storage device 708 and thus the description of energy storage device 708 provided above likewise applies to energy storage device 808.

Each generator may be configured to output alternating current. Because the common bus 824 is a DC bus, each generator may be coupled to common bus 824 via rectifier that converts the AC to DC. First generator 810 is coupled to common bus 824 via a first rectifier 839. Second generator 814 is coupled to common bus 824 via a second rectifier 840. Third generator 818 is coupled to common bus 824 via a third rectifier 844.

Common bus 824 is coupled to a plurality of loads and is configured to supply electricity to each of the coupled loads as demanded. In engine system 800, common bus 824 is coupled to a first motor 826, a second motor 828, a third motor 830, and additional loads 832. Second motor 828 is coupled to a first propeller 834 and third motor 830 is coupled to a second propeller 836. While not shown in FIG. 8, first motor 826 may be coupled to a suitable load, such as a blower, compressor, or other driven component. The additional loads 832 may include hoteling loads (e.g., lights, cabin power, etc.), alternators, energy storage devices, compressors, blowers, or other driven loads.

Each of the loads of engine system 800 (e.g., first motor 826, second motor 828, third motor 830, and additional loads 832) may be coupled to common bus 824 via respective power conversion components. The power conversion components are electrical power conversion components and may act to increase or decrease voltage supplied to the respective loads, convert or invert the current (e.g., from DC to AC or vice versa) or otherwise control or regulate the electricity provided to each load. As shown in FIG. 8, first motor 826 may be coupled to common bus 824 via a first converter 838. Second motor 828 may be coupled to common bus 824 via a second converter 742. Third motor 830 may be coupled to common bus 824 a third converter 846. Additional loads 832 may be coupled to common bus 824 via fourth converter 848.

Engine system 800 includes a controller 850. Controller 850 may be similar to controller 150 of FIG. 1 and controller 550 of FIG. 5 and thus include one or more processors and memory. Controller 850 may store instructions in memory executable by the one or more processors to carry out the methods described herein. Further, controller 850 is operably coupled to a generator output sensor 852 which is positioned to measure a parameter of generator output carried on common bus 824 (e.g., current or voltage) and to an energy storage sensor 853 positioned to measure one or more parameters of energy storage device 808 (e.g., current or voltage supply or discharge). The signal from generator output sensor 852 and/or from energy storage sensor 853 may be used by controller 850 in order to determine if one or more of the engines of engine system 800 is exhibiting imbalance, in a manner similar to the engine imbalance detection described above with respect to FIG. 4 and with respect to FIGS. 5 and 7.

Further, various components of engine system 800 may contribute to the generator output signal. As described above with respect to FIGS. 4 and 5, if these contributions affect the imbalance detection (e.g., by overlapping with one or more engine frequencies or otherwise contributing to the selected frequencies analyzed in the imbalance detection), the imbalance detection may be adjusted by delaying the imbalance detection, adjusting a threshold magnitude that a frequency magnitude is compared to, shutting off or changing a speed of a component (e.g. an engine may be shut off), or other adjustment. The power conversion components may contribute to the generator output signal. Likewise, the motors may be contributing to the generator output signal. The loads driven by the electricity generated by the generators may contribute to the generator output signal (e.g., the propellers). Additional details of the imbalance detection and identification of the components contributing to the frequency content of the generator output signal will be provided below with respect to FIGS. 10A and 10B.

While engine system 800 was described above as including two propellers, in some examples engine system 800 may not be a marine vessel, and thus the propellers may be omitted and instead the second and third motors may drive different loads (e.g., traction wheels). Further, in some examples one or more of the motors of engine system 700 may be replaced with other loads. Further still, additional or alternative power conversion components may be present in engine system 800 that are not illustrated in FIG. 8, such as inverters, additional converters, rectifiers, or the like. Additionally, engine system 800 may include more or fewer engines than illustrated in FIG. 8.

Figure 9:
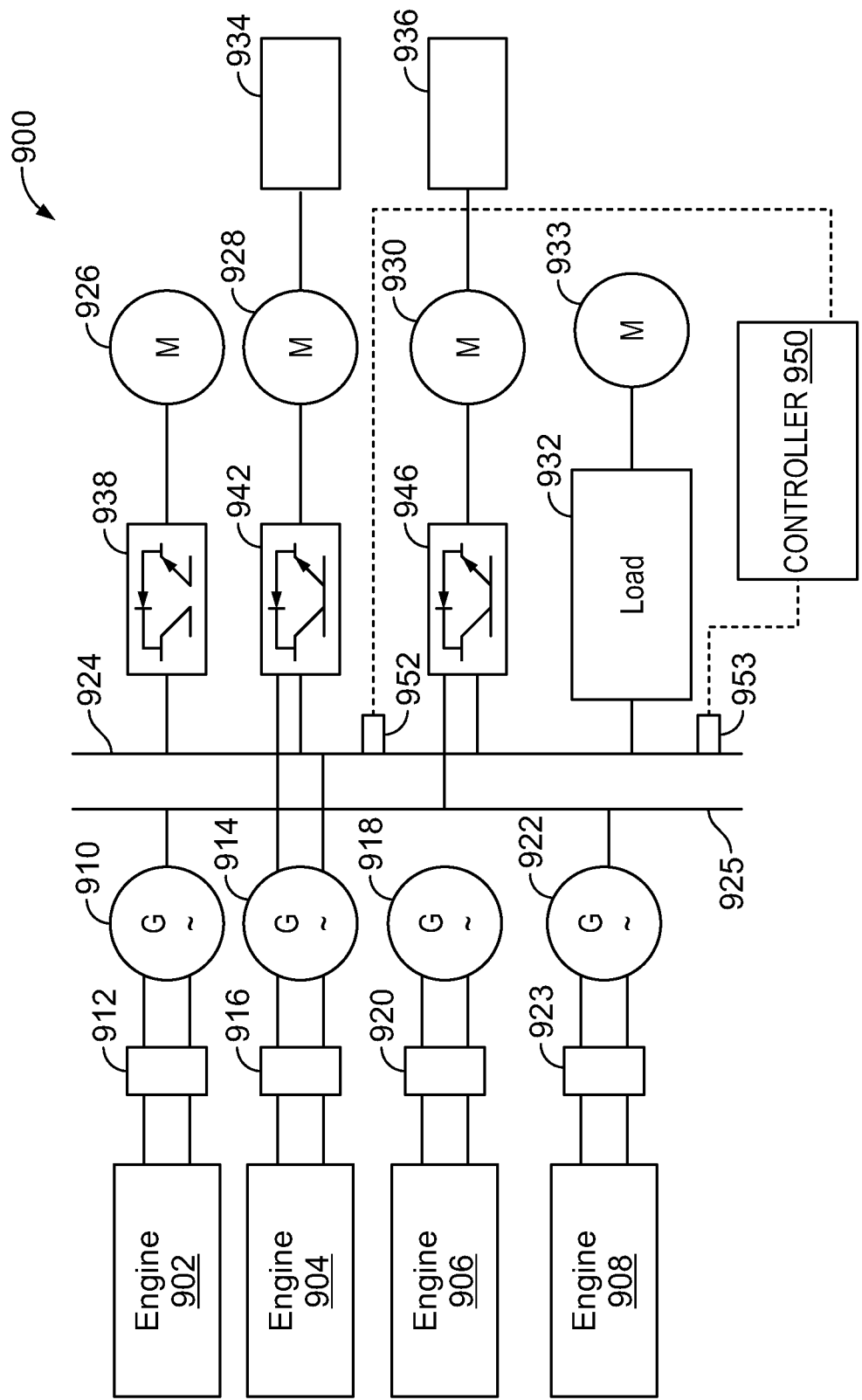

FIG. 9 shows a fifth configuration of an engine system 900. Engine system 900 may be installed in a vehicle, such as a marine vessel or other suitable vehicle. In other examples, engine system 900 may be installed in a stationary platform where the engines described below generate electricity via the coupled generators in order to power various loads.

Engine system 900 is similar to engine system 500 of FIG. 5, and thus includes a plurality of engines and corresponding generators that generate electricity that is supplied to a plurality of loads via a bus. However, rather than including a single, common bus, engine system 900 includes two buses, first bus 924 and second bus 925. Each of the generators may be coupled to one of the buses. The first bus 924 and second bus 925 may be decoupled; however, first bus 924 and second bus 925 may be coupled together under some conditions (such as when one of the buses is degraded). Accordingly, as shown, engine system 900 includes a first engine 902, a second engine 904, a third engine 906, and a fourth engine 908. Each engine of engine system 900 may be non-limiting examples of engine 110 of FIG. 1, and thus description of engine 110 provided above with respect to FIGS. 1 and 2 likewise applies to the engines of engine system 900.

Each engine is coupled to a respective generator via a respective engine shaft, similar to the engine-generator coupling described above with respect to FIGS. 1 and 2. Accordingly, a first generator 910 is coupled to first engine 902 via a first engine shaft 912, a second generator 914 is coupled to second engine 904 via a second engine shaft 916, a third generator 918 is coupled to third engine 906 via a third engine shaft 920, and a fourth generator 922 is coupled to fourth engine 908 via a fourth engine shaft 923. Each generator is configured to generate electricity via rotation of the respective engine shaft. The electricity generated by the generators is used to power one or more loads, which will be explained in more detail below, via first bus 924 or second bus 925. In the example shown in FIG. 9, first bus 924 and second bus 925 are each an AC bus configured to carry alternating current. As shown in FIG. 9, first bus 924 is coupled to first generator 910 and second generator 914. Second bus 925 is coupled to third generator 918 and fourth generator 922. First bus 924 and second bus 925 may be decoupled from each other, at least during some conditions. When first bus 924 and second bus 925 are decoupled, first generator 910 and second generator 914 are only coupled to respective loads (explained below) via first bus 924. Likewise, when first bus 924 and second bus 925 are decoupled, third generator 918 and fourth generator 922 are only coupled to respective loads via second bus 925. However, first bus 924 and second bus 925 may be coupled together under some conditions, which may couple each generator to each load via the coupled first bus 924 and second bus 925 (which may then act as a common bus).

First bus 924 and second bus 925 are coupled to a plurality of loads and are configured to supply electricity to each of the coupled loads as demanded. In engine system 900, first bus 924 is coupled to a first motor 926 and a second motor 928. Second bus 925 is coupled to a third motor 930 and additional loads 932. Second motor 928 is coupled to a first propeller 934 and third motor 930 is coupled to a second propeller 936. While not shown in FIG. 9, first motor 926 may be coupled to a suitable load, such as a blower, compressor, or other driven component. The additional loads 932 may include hoteling loads (e.g., lights, cabin power, etc.), alternators, energy storage devices, compressors, blowers, or other driven loads. Further, as shown in FIG. 9, one of the additional loads may include a motor 933.

Each of the loads of engine system 900 (e.g., first motor 926, second motor 928, third motor 930, and additional loads 932) may be coupled to first bus 924 and/or second bus 925 via respective power conversion components. The power conversion components are electrical power conversion components and may act to increase or decrease voltage supplied to the respective loads, convert or invert the current (e.g., from AC to DC or vice versa) or otherwise control or regulate the electricity provided to each load. As shown in FIG. 9, first motor 926 may be coupled to first bus 924 and/or second bus 925 via a first converter 538. Second motor 928 may be coupled to first bus 924 and/or second bus 925 via a second converter 942. Third motor 930 may be coupled to first bus 924 and second bus 925 via a third converter 946. While FIG. 9 shows additional loads 932 (including motor 933) coupled to first bus 924 and/or second bus 925 without any intervening power conversion components, in some examples one or more power conversion components may be coupled between the buses and the additional loads, such as a transformer, converter, etc. Additionally, while the only power conversion components shown in FIG. 9 are converters, in some examples, additional power conversion components may be present, such as transformers, inverters, etc.

Engine system 900 includes a controller 950. Controller 950 may be similar to controller 150 of FIG. 1 and thus include one or more processors and memory. Controller 950 may store instructions in memory executable by the one or more processors to carry out the methods described herein. Further, controller 950 is operably coupled to a first generator output sensor 952 coupled to first bus 924 and a second generator output sensor 953 coupled to second bus 925. First generator output sensor 952 is positioned to measure a parameter of generator output carried on first bus 924. For example, first generator output sensor 952 may measure a current carried on first bus 924 or a voltage supplied via first bus 924. Likewise, second generator output sensor 953 may measure a current carried on second bus 925 or a voltage supplied via second bus 925. Due to each bus being selectively couplable to each generator, current or voltage measured by first generator output sensor 952 and second generator output sensor 953 may be representative of the output of more than one generator depending on how the generators are coupled to the buses. The signals from first generator output sensor 952 and second generator output sensor 953 may be used by controller 950 in order to determine if one or more of the engines of engine system 900 is exhibiting imbalance, in a manner similar to the engine imbalance detection described above with respect to FIGS. 4 and 5.

For example, the output from first generator output sensor 952 and/or second generator output sensor 953 may be sampled to generate a first generator output signal and a second generator output signal, respectively. Each generator output signal may be analyzed to determine the frequency content of the respective generator output signal. The frequency content may be analyzed to determine if one or more engines is exhibiting imbalance. However, because multiple generators may be coupled to the same bus, and further because which generators are coupled to which bus may change, multiple frequencies each determined based on a speed of a respective engine may be selected for analysis to determine if imbalance is present, for each of the signals output by the generator output sensors. As explained above with respect to FIG. 5, the imbalance detection routine may be performed with when one or more engines are not operating in order to facilitate isolation of the contribution to the generator output signals for each generator.

Further, various components of engine system 900 may contribute to the generator output signal. As described above with respect to FIGS. 4 and 5, if these contributions affect the imbalance detection (e.g., by overlapping with one or more engine frequencies or otherwise contributing to the selected frequencies analyzed in the imbalance detection), the imbalance detection may be adjusted. Example contributions to the generator output signals may include the power conversion components, the motors, and the loads driven by the electricity generated by the generators (e.g., the propellers). Additional details of the imbalance detection and identification of the components contributing to the frequency content of the generator output signal will be provided below with respect to FIGS. 10A and 10B.

While engine system 900 was described above as including two propellers, in some examples engine system 900 may not be a marine vessel, and thus the propellers may be omitted and instead the second and third motors may drive different loads (e.g., traction wheels). Further, in some examples one or more of the motors of engine system 900 may be replaced with other loads. Additionally, engine system 900 may include more or fewer engines than illustrated in FIG. 9.

Figure 10A:
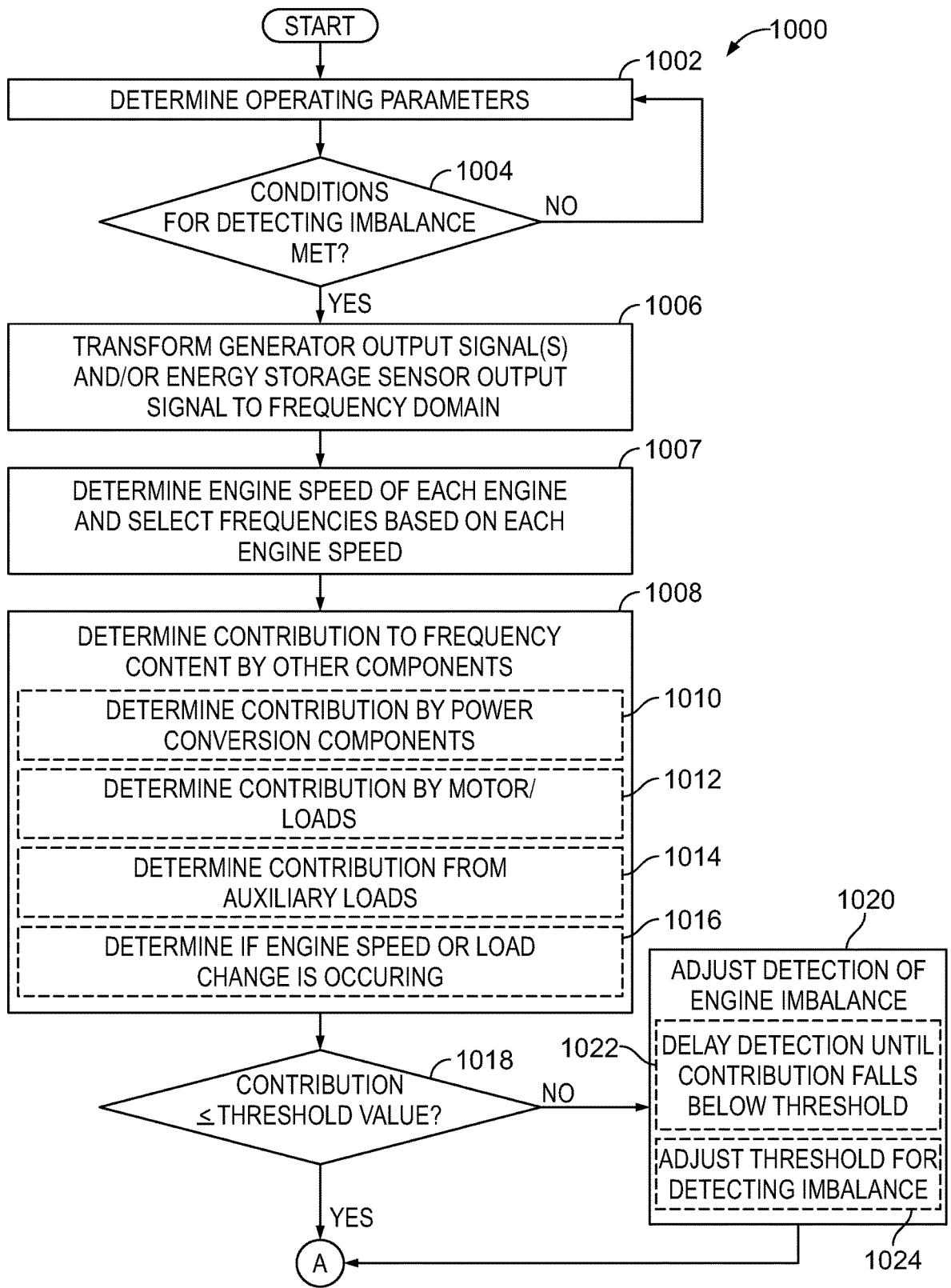
FIGS. 10A and 10B illustrate a flow chart for a method for detecting imbalance in an engine, according to an embodiment.
Figure 10B:
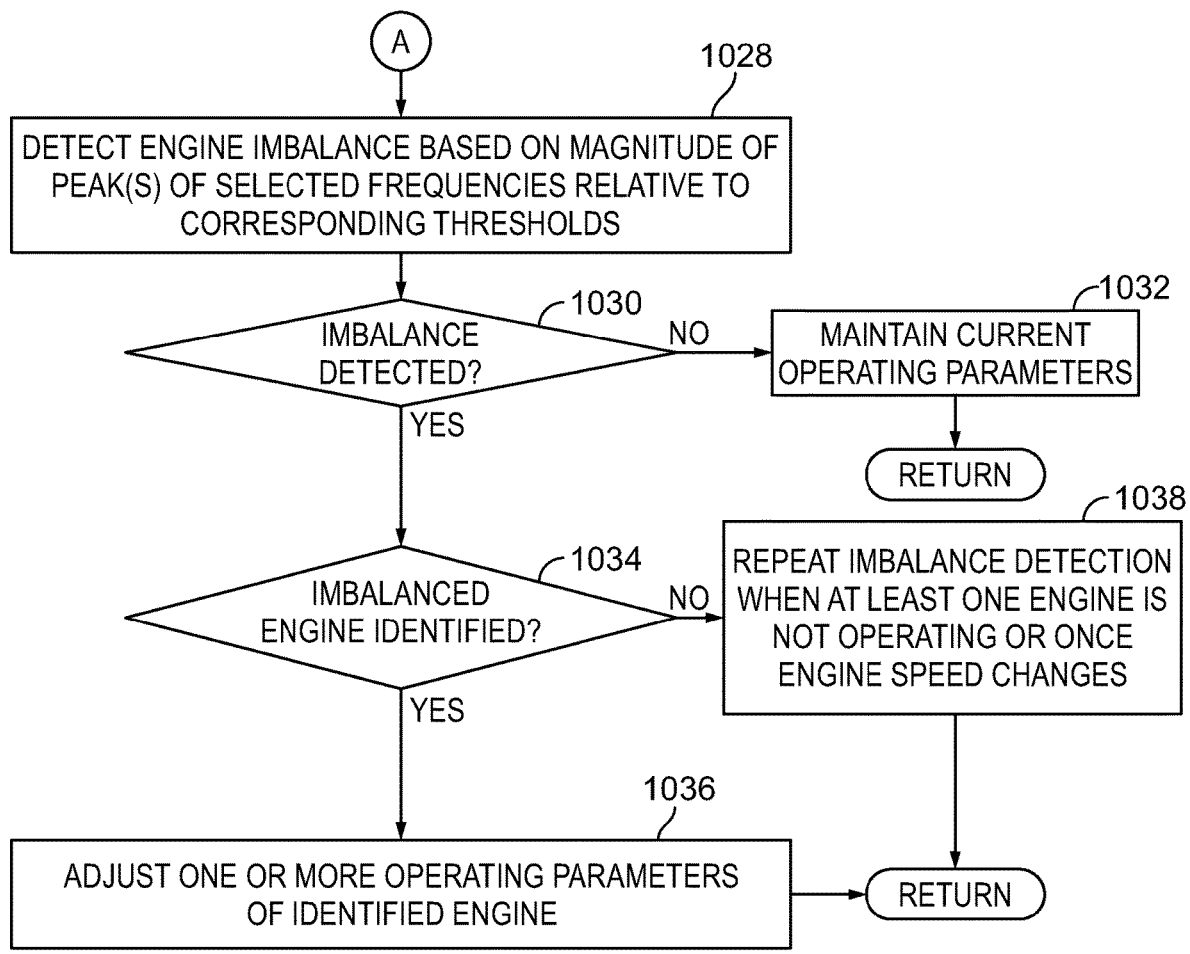

Turning now to FIGS. 10A and 10B, a method 1000 for diagnosing an engine degradation is presented. Method 1000 may be carried out according to instructions stored in memory of a controller, such as controller 550 of FIG. 5, controller 650 of FIG. 6, controller 750 of FIG. 7, controller 850 of FIG. 8, or controller 950 of FIG. 9, in order to diagnose an engine condition, such as a misfiring cylinder, based on output from a sensor configured to measure a parameter of generator output, such as generator output sensor 552, generator output sensor 652, generator output sensor 752, generator output sensor 852, or generator output sensor 952, or generator output sensor 953. In some examples, the engine condition may be diagnosed based on output from an energy storage sensor, such as energy storage sensor 753 or energy storage sensor 853. Method 1000 may be executed in an engine system that includes two or more engines, such as the engine systems described above with respect to FIGS. 5-9.

If misfire or other engine degradation is detected, method 1000 may identify which engine of the two or more engines is exhibiting the degraded condition, and adjust one or more operating parameters of the identified engine to mitigate the source of degradation, such as adjusting fuel injection amounts to the degraded cylinder. While method 1000 is described below with respect to the systems and components of FIGS. 5-9, it is to be understood that the imbalance detection may be performed on other engines and other system configurations.

At 1002 (shown in FIG. 10A), method 1000 determines engine system operating parameters. The determined operating parameters include, but are not limited to, engine speed for each engine, engine load for each engine, generator load for each generator, auxiliary load status, motor speed (for each motor in the engine system), propeller speed for each propeller, and other parameters. At 1004, method 1000 includes determining if conditions for detecting imbalance have been met. As explained above with respect to FIGS. 2-4, and explained in more detail below, degradation of one or more engines may be detected based on a parameter of generator output, such as the DC link voltage, AC current on an AC bus, AC bus voltage, etc. For example, the frequency content of the voltage signal output by the generator output sensor may be analyzed to determine if one or more cylinders of an engine are misfiring, hence causing imbalance in the engine shaft rotation for that engine and corresponding imbalance in the generator output (e.g., voltage or current). To accurately identify imbalance or aberrations in the generator output signal, the generator output signal may be analyzed only during conditions where the engine shaft speeds are consistent, for example. Thus, at least in one embodiment, the conditions for detecting imbalance may include each engine speed being within a speed range, steady-state operating conditions (e.g., each engine speed and/or engine load are changing by less than a threshold amount), and/or other conditions. In some examples, the conditions for detecting imbalance may include all engines of the engine system operating. In other examples, the conditions for detecting imbalance may include at least one but not all of the engines of the engine system operating. For example, and as explained in more detail below, when multiple engines and corresponding generators are coupled to the same common electrical bus, the generator output on the electrical bus may be analyzed to detect engine imbalance. However, with the multiple engines contributing to the frequency content of the generator output signal, depending on the speeds of the engines, one or more engines may contribute to the frequency content of the signal in a manner that may confound detection of imbalance of another engine or that may make it difficult to determine which engine is exhibiting imbalance, if imbalance were to be detected. As such, in some examples, the imbalance detection described herein may be executed when only engine is operating. In other examples, the engine imbalance detection may be executed when only two engines are operating, or when only three engines are operating.

If the conditions for detecting imbalance have not been met, method 1000 loops back to 1002 to continue monitoring operating parameters. If the conditions for detecting imbalance have been met, method 1000 proceeds to 1006 to transform the generator output signal(s) (e.g., the signal output from generator output sensor 552, generator output sensor 652, generator output sensor 752, or generator output sensor 852, or first generator output sensor 952 and second generator output sensor 953) into the frequency domain and/or transform the energy storage signal (e.g., the signal output from energy storage sensor 753 or energy storage sensor 853) into the frequency domain. Transforming the signal(s) may include performing a fast Fourier transform on each signal, bandpass filtering the signal(s), or other suitable transformation. The frequency content of the signal(s) may include a fundamental (e.g., first order) frequency and harmonics (e.g., the half-order, one and half order, second order, etc.).

At 1007, method 1000 includes determining an engine speed of each engine and selecting one or more frequencies for the imbalance detection based on each engine speed. For example, referring to FIG. 5, a first engine speed of first engine 502 may be determined, a second engine speed of second engine 504 may be determined, a third engine speed of third engine 506 may be determined, and a fourth engine speed of fourth engine 508 may be determined. One or more frequencies may be identified based on each engine speed. To detect imbalance, as explained below, the half order frequency component may be analyzed. Accordingly, if the first engine speed is 500 RPM, the second engine speed is 750 RPM, the third engine speed is 900 RPM, and the fourth engine speed is 1000 RPM, the selected frequencies may include 4.16 Hz, 6.25 Hz, 7.5 Hz, and 8.33 Hz (which frequencies correspond to the half order frequency for each engine speed). If an engine is not operating, no frequency for that engine may be identified.

In engine systems that include more than one bus and thus include more than one generator output signal, such as engine system 900 of FIG. 9, the determination of the frequencies for the imbalance detection may also include determining which frequencies are associated with which generator output signal. As an example, first engine 902 and second engine 904 may be coupled to first AC bus 924 while third engine 906 and fourth engine 908 may be coupled to second AC bus 925. Accordingly, the frequencies associated with first engine 902 and second engine 904 (e.g., 4.16 Hz and 6.25 Hz) may be assigned to the generator output signal from first generator output sensor 952 while the frequencies associated with third engine 906 and fourth engine 908 (e.g., 7.5 Hz and 8.33 Hz) may be assigned to the generator output signal from first generator output sensor 953. However, if degradation of one of the buses is determined, or the two buses are otherwise coupled together, each engine may be coupled to a common bus and thus all selected frequencies may be associated with the same generator output signal.

At 1008, method 1000 includes determining a contribution to the frequency content of the generator output signal (s) and/or energy storage signal by other components of the engine system. As used herein, "other components" of the engine system may include components separate from a given engine, such as power conversion components (e.g., inverters, converters, rectifiers, transformers), motors, propellers, or other reciprocating loads, that in some conditions may contribute to the frequency content of the generator output signal(s) and/or energy storage signal. The "other components" may also include a contribution by the given engine that is unrelated to engine imbalance, such as an increase in engine load. Further, the "other components" may also include other engines in the engine system. For example, when the engine system includes four engines, if two of the engines are operating at the same speed or at speeds that are multiples of each other (e.g., one at 500 RPM and one at 1000 RPM), a first engine of the two engines may contribute to the frequency content of the generator output signal in a manner that could confound detection or identification of imbalance in a second of the two engines.

Under select conditions (e.g., during select modes of operation), the engines, one or more components of the engines, or one or more components of the system in which the engines are installed may contribute to the generator output signal. When the frequency content of the generator output signal is analyzed to detect engine imbalance, for example, imbalance may be indicated if the other components are contributing to the frequency content, thus leading to false positive indications of engine imbalance or other types of degradation. Because detection of engine imbalance may lead to engine operating adjustments, including adjustment of fuel injection amounts, and in some cases may lead to engine shutdown, false positive indications of imbalance may be costly, time consuming, waste fuel, or have other consequences. Thus, as explained herein, the contribution of the other components to the frequency content may be detected, and if the contribution is above a threshold, the detection of the imbalance may be adjusted to compensate for the contribution by the other components.

One type of component that may contribute to the frequency content of generator output signal is power conversion components. The power conversion components may be electrical components that act to regulate or modify aspects of the power distributed in the engine system, and may include inverters, converters, transformers, rectifiers, and the like. In one example, the generator output signal may be affected by an inverter base frequency. Accordingly, determining the contribution to the frequency content by another component of the engine system includes, at 1010, determining the contribution of one or more power conversion components. To determine the contribution by the one or more power conversion components, the frequency of each power conversion component may be determined. If a power conversion component frequency is within a threshold of an engine frequency, it may be determined that the power conversion component is contributing to the frequency content of the generator output signal. As such, when the power conversion component frequency is at or near an engine frequency (e.g., if the power conversion component frequency is within 0.5 or 1 Hz of an engine frequency), the contribution to the frequency content by the power conversion component may be above a threshold value.

In another example, the contribution by the one or more power conversion components may be determined based on one or more sideband frequencies of an engine frequency. When an engine imbalance occurs, the magnitude of the half-order frequency component of the frequency content of the generator output signal increases. However, this effect on the generator output is relatively narrow-spectrum, and thus only the half-order frequency may be affected by the imbalance. In contrast, the one or more power conversion components (as well as other components that contribute to the frequency content) may affect the generator output on the common bus in a relatively wide-spectrum manner, e.g., the contribution by the power conversion component may not be limited to the half-order frequency. Thus, to detect the contribution to the frequency content by the power conversion components, the sidebands of one or more selected frequency components may be analyzed. If the sidebands are greater than a threshold, then ii may be indicated that the contribution by the inverters is greater than a threshold value.

In an example, if one of the engines is operating at 1050 RPM, the engine frequency (e.g., the engine revolution frequency) is 17.5 Hz, giving a half-order frequency of 8.75 Hz. The main peak of the half-order frequency component may be identified as a band around 8.75, such as 8.5-9, and the sidebands may be identified as frequency bands adjacent to the main peak, such as a first side band of 8-8.5, a second side band of 9-9.5, a third sideband of 7.5-8, and a fourth sideband of 9.5-10. The magnitude of each sideband may be determined, and each sideband magnitude may be summed. The sum of the magnitudes of the sidebands may be compared to a threshold magnitude. In one example, the threshold magnitude may be one-half the threshold magnitude used to determine engine imbalance (explained below). If the summed sideband magnitude is greater than the threshold, it may be indicated that a power conversion component is contributing to the frequency content.

Other components in addition to the power conversion components may contribute to the frequency content of the generator output signal, including generator auxiliary loads, motors, motor loads (e.g., a propeller), other engines, as well as fluctuations in the engine itself. Thus, as indicated at 1012, determining the contribution to the frequency content by the other components may include determining the contribution to the frequency content by one or more motors and/or one or more motor loads. For example, referring to FIG. 5, propeller 534 may be operating at a speed that is the same as the first engine speed or is a harmonic of the first engine speed (e.g., 250 RPM or 500 RPM). In such examples, the propeller may contribute to the frequency content that will be analyzed in order to detect if the first engine is exhibiting imbalance. If a motor or motor load is determined to be cycling (e.g., turning or reciprocating) with a frequency that is the same or a multiple of one of the identified frequencies selected above (e.g., the frequencies that are selected based on the engine speeds), the contribution by the motor or motor load may be determined to be above the threshold. Additionally, in examples where the motor load is a propeller, the propeller pitch may affect the frequency content of the generator output signal, and thus the propeller pitch may be analyzed in addition to the propeller speed in order to determine if the propeller is contributing to the frequencies of interest.

Further, as indicated at 1014, determining the contribution to the frequency content by the other components may include determining the contribution to the frequency content by one or more auxiliary loads. The auxiliary loads may include a blower, compressor, radiator fan, additional alternator, or other component that is powered by the common bus and/or contributes to the generator load or generator output signal. If an auxiliary component (e.g., the blower, compressor, or radiator fan) reciprocates with a frequency that is the same (e.g., within 5 or 10%) or a multiple of one of the identified frequencies selected above (e.g., the frequencies that are selected based on the engine speeds), or if the auxiliary component reciprocates with a frequency that is the same (e.g., within 5 or 10%) as an engine frequency, it may be indicated that the auxiliary load is contributing to the generator output signal.

Further, as indicated at 1016, determining the contribution to the frequency content by another component may include determining if an engine speed or load change is occurring or has occurred during the sensor sampling or transformation period, or determining if two or more engines are operating at the same frequency or multiples of each other. If an engine speed or load changes, it may result in a change in engine shaft speed, thus affecting the generator output signal. As such, if an engine speed or load changes, it may be determined the contribution to the frequency content by an engine is above the threshold value. As another example, if two engines are operating at the same speed (and thus have the same half order frequency), or at substantially the same speed (e.g., within 5 or 10% of each other), or at multiples of the same speed (such that the half order frequency of one engine is the same or substantially the same as the first order frequency of another engine), it may be determined that the contribution to the frequency content by an engine is greater than the threshold value.

At 1018, method 1000 includes determining if the contribution to the frequency content by the other components is less than or equal to a threshold value. In some examples, the threshold value may be zero, such that any contribution is determined to be above the threshold value. In other examples, the threshold may be greater than zero, so that a small amount of contribution to the frequency content is deemed acceptable. It is to be understood that in some examples, the threshold value may not be numeric but instead may be a yes or no determination (e.g., if an engine load change is occurring, the contribution may be determined to be above the threshold). Further, in some examples, the threshold value may depend on the type of component contributing to the frequency content, e.g., the inverter contribution may be deemed greater than the threshold when the sideband frequency magnitudes are greater than a threshold magnitude while the auxiliary load contribution may be deemed greater than the threshold when an auxiliary load is added. Further, in examples where multiple generator output signals are analyzed (e.g., in engine system 900), the contribution to the frequency content may be determined per generator output signal. In other words, for a first generator output signal, only the contribution by the other components to the frequency content of the first generator output signal may be considered and not the contribution by the other components to the frequency content of the second generator output signal. In this way, if a first power conversion component has a frequency that is the same or substantially similar to only a first engine frequency (and similar to the other engine frequencies), the first power conversion component may only be considered to be contributing to the frequency content if the first power conversion component is coupled to the same bus as the first engine.

If the contribution is determined greater the threshold, method 1000 proceeds to 1020 adjust the detection of the imbalance. This may include delaying the detection until the contribution drops below the threshold, as indicated at 1022. As the sources that contribute to the frequency content are typically transient, the detection of the engine imbalance may be delayed (e.g., by a predetermined amount of time or number of engine cycles) until the component is no longer contributing to the frequency content of the generator output signal. In another example, the adjusting of the detection of engine imbalance may include adjusting a threshold used in the imbalance determination, as indicated at 1024. As will be explained in more detail below, engine imbalance may be indicated when the half-order frequency component (e.g., 8.75 Hz for an engine at 1050 RPM, or a mean or sum of a bucket of frequencies around a selected frequency component) or other target frequency component is greater than a threshold magnitude (e.g., the magnitude predicted for a healthy engine). When the contribution to the frequency content by another component in the engine system is greater than the threshold contribution value (e.g., the inverters are operating at a frequency near an engine frequency), this threshold magnitude used for determining imbalance may be increased to reduce the number of false positive imbalance detections. In this way, while more subtle engine imbalances may go undetected, at least for a duration, stronger imbalances may be detected without unnecessarily adjusting engine parameters or shutting down the engine due to false indications of imbalance. If the imbalance detection is delayed, method 1000 may return to execute the imbalance monitor at a subsequent time when the contribution has decreased to below the threshold. If the imbalance detection is adjusted, method 1000 may proceed to 1028 to carry out the imbalance detection.

If at 1018 it is determined that the contribution by the other components is less than or equal to the threshold value, or if the imbalance detection is to be adjusted at 1024, method 1000 proceeds to 1028 (shown in FIG. 10B) to detect engine imbalance based on respective magnitudes of each peak of each selected frequency. In one example, the main peak of the half-order frequency component for each selected frequency may be analyzed (e.g., each peak corresponding to the half-order frequency of each engine), and if a magnitude is greater than a threshold magnitude, engine imbalance may be indicated. However, other frequency components (e.g., first order, second order) may be analyzed, either alone or in combination. Other mechanisms for detecting engine imbalances based on the generator output signal frequency content are possible.

As an example, the selected frequencies may include 4.16 Hz, 6.25 Hz, 7.5 Hz, and 8.33 Hz (e.g., which may be the half order frequencies for engine speeds of 500, 750, 900, and 1000 RPMs, respectively). Thus, a magnitude of the main peak at 4.16 Hz may be compared to a threshold to detect imbalance in the first engine, a magnitude of the main peak at 6.25 Hz may be compared to a threshold to detect imbalance in the second engine, a magnitude of the main peak at 7.5 Hz may be compared to a threshold to detect imbalance in the third engine, and a magnitude of the main peak at 8.33 Hz may be compared to a threshold to detect imbalance in the fourth engine. Each of the thresholds may be the same, or each threshold may be specific to a given frequency (e.g., the threshold for 6.25 Hz may be different than the threshold for 7.5 Hz). As explained above with respect to FIG. 3, the thresholds may be based on magnitudes that a healthy engine would be expected to exhibit.

However, referring to the first engine (having an engine speed of 500 RPM) and the fourth engine (having an engine speed of 1000 RPM), the first order frequency component for the first engine is the same as the half order frequency component for the fourth engine. Thus, magnitude of the main peak at the half order frequency component for the fourth engine (e.g., at 8.33 Hz) may reflect the half order frequency component for the fourth engine and the first order frequency component for the first engine. As such, the magnitude, when compared to the threshold, may indicate imbalance in the fourth engine even if imbalance is not present. To mitigate this issue, the imbalance detection for the fourth engine may not be performed (e.g., it may be delayed until the first engine speed or the fourth engine speed changes, or the imbalance detection may be repeated during conditions where the first engine may be shut off).

Further, as explained above, rather than analyzing a single, main peak corresponding to each selected frequency component, a bucket including multiple frequencies around each selected frequency component may be analyzed, such as the frequency components in the 4-4.5 Hz range for the selected frequency of 4.16 Hz. When more than one peak is analyzed to determine imbalance, the peaks may be summed or averaged and then compared to a threshold. In one example, the mean frequency bucket sum of RMS square is compared to an imbalance threshold, and if the mean frequency bucket is greater than the imbalance threshold, imbalance may be determined. Likewise, when the sideband frequency content is analyzed to determine if the inverters or other components are contributing to the signal content, the sideband frequency bucket sum of RMS square is compared to a threshold, which in some examples may be one-half the imbalance threshold.

At 1030, method 1000 determines if imbalance is detected. If is determined that no imbalance is detected, method 1000 proceeds to 1032 to maintain current operating parameters, including maintaining fuel injection parameters (e.g., amounts, timing) for each engine. However, if not all engines were analyzed (e.g., because of overlapping or conflicting engine speeds), imbalance may not be detected but the detection may be repeated under different conditions that may facilitate imbalance detection in the engines that were not analyzed.

If imbalance in one or more engines detected, method 1000 proceeds to 1034 to determine if the engine(s) exhibiting the imbalance can be identified. If each engine is operating at different engine speeds, the engine that is exhibiting the imbalance may be identified based on the magnitude of the peak at the half order frequency component (or other frequency component) that is above its corresponding threshold. In the example presented above, if the peak at 6.25 Hz has a magnitude that is above its threshold, the second engine may be identified as the engine exhibiting the imbalance. However, as explained above, if two or more engines are operating at the same or substantially the same engine speeds (e.g., within 5 or 10% of each other), the engines will have the same frequency and thus the generators coupled to the engines will contribute to the generator output signal in the same manner. For example, if two engines are operating at 750 RPM, the two engines will both have a half order frequency of 6.25 Hz. In such an example, if the peak at 6.25 Hz has a magnitude that is above its threshold, both of the engines may be identified as the engine exhibiting the imbalance. Accordingly, the detection may not be able to sufficiently identify which engine is exhibiting the imbalance.

If the engine that is exhibiting the imbalance is identified, method 1000 proceeds to 1036 to adjust one or more engine operating parameters of the identified engine to mitigate the imbalance. The adjusting of the engine operating parameters may include adjusting a fuel injection amount to a cylinder that is determined to be misfiring (e.g., if the engine is a multi-fuel engine configured to combust gaseous and liquid fuel, the amount of liquid fuel relative to gaseous fuel may be increased in the misfiring cylinder), or all cylinders of the engine. Other engine adjustments may include adjusting fuel injection or ignition timing, valve timing, exhaust gas recirculation, boost pressure, or other parameters. Further, depending on the level of imbalance and whether it can be mitigated via engine parameter adjustments, the engine power may be derated or the engine may be shut down in some examples. Method 1000 then returns.

If the engine that is exhibiting the imbalance cannot be identified, method 1000 proceeds to 1038 to repeat the imbalance detection when at least one engine is not operating, or once engine speed has changed. For example, if the two engines operating at 750 RPM are identified as possibly exhibiting imbalance, the imbalance detection may be repeated when only one of the two engines is operating. If the engine system is operating at part load where output from all engines is not required to meet power demand, one of the two engines may be shut down, and the imbalance detection may be repeated. If imbalance in the still-operating engine is detected, that engine may be identified as exhibiting the imbalance. If imbalance in the still-operating engine is not detected, the shutdown engine may be identified as the engine exhibiting the imbalance. Method 1000 then returns.

Thus, engine imbalance may be detected via generator output. For example, if a fuel injector is faulty or the intake or exhaust valves are degraded, incomplete combustion may occur, and hence a lower combustion torque may be produced. The sum total of these combustion torques is seen by the generator, and the generator produces an electromagnetic torque whose profile matches with the engine shaft torque. Using the generator as a sensor, faults in the system may be identified without the use of additional sensors. However, the generator output (such as the DC link voltage or AC bus voltage) sees interference from a variety of other sources including other engines, inverters, auxiliaries, alternators, engine speed shaft oscillations due to sudden load, capacitor failures, etc. These potential sources of noise may be identified and addressed to help improve the fidelity of the imbalance determination and eliminate false positives. For removing interference from the inverters (or other power conversion components), sideband frequencies may be evaluated, and those signals may be eliminated when the values are beyond a threshold.

Further, in some examples, the method described above may be applied to output from other engine system sensors, such as engine speed sensors, alternator voltage sensors, or engine shaft torque sensors. Therein, sources of noise to the sensor output may be identified (e.g., inverter operation, sudden engine load changes, engagement or disengagement of auxiliary loads, etc.) and the detection of engine imbalance may be delayed until the contribution to the sensor output frequency content is below a threshold, or the engine imbalance detection may be adjusted (e.g., the threshold magnitude for indicating imbalance may be increased). For example, the inverters may contribute to a signal output by an engine shaft torque sensor, and if this contribution is determined to be above a threshold, the engine imbalance detection may be delayed, or the threshold magnitude used to determine if engine imbalance is present may be increased.

In engine systems that include multiple engines each coupled to a generator and each generator coupled to a common bus, the engines themselves may act as sources of noise. To mitigate the noise and ensure robust imbalance detection, the generator output sensor signal may be analyzed during various operating conditions where each engine may be operating, or some engines may not be operating. For example, the generator output signal may be analyzed with all engines and all generators operating. In another example, the generator output signal may be analyzed as each engine is turned on (or off) one at a time (e.g., starting with all four engines on, a first engine may be turned off, and the generator output signal analyzed to detect imbalance; the first engine may be turned on and then a second engine may be turned off and the generator output signal analyzed; the second engine may be turned on the third engine turned off, and so forth). As another example, each engine may be turned on (or off) one after the other until all the engines are on (or off). The generator output signal may be analyzed each time an engine is turned on (or off). A similar approach may be taken with other sensors that may be operable to detect imbalance, such as the energy storage sensors described herein, engine shaft speed sensors, or the like.

When analyzing the generator output signal, sources of noise may be identified and ignored, if possible. The sources of noise may include a motor frequency or multiple of the motor frequency, power conversion component switching frequency (or multiple thereof), or noise from converters, propellers, or other reciprocating connected components. Further, when the common bus is an AC bus, the fundamental frequency and harmonics of the AC may be identified and ignored (e.g., 50 or 60 Hz and harmonics thereof).

As explained above, the AC bus voltage harmonics to which engine(s) is/are connected may be analyzed to determine imbalance of one or more engines. If different engines are operating at different engine frequencies, multiple frequencies may be analyzed (each frequency may correspond to multiple/sub-multiple of an engine mechanical frequency). The frequencies of interest may be half order or any multiple/sub-multiple of the engine frequency/frequencies. The analysis can be carried out in similar fashion in case of a common DC link. The frequencies of noise may need be ignored (to avoid nuisance detections), which may include the propeller frequency and/or multiple/sub-multiple frequencies and other load inverter fundamental/switching frequencies and/or multiple/sub-multiple of those.

It may be beneficial to leverage any opportunity available when not all the engines are engaged to eliminate or confirm imbalance in the engine that is not part of the analysis, since not all the engines are engaged all the time. Depending on the load, if not all the engines are engaged, then the engines may be engaged cyclically to improve imbalance evaluation under various scenarios. It may be further beneficial to capture parameters of interest when there are no transients (to avoid nuisance detections).

Figure 11:
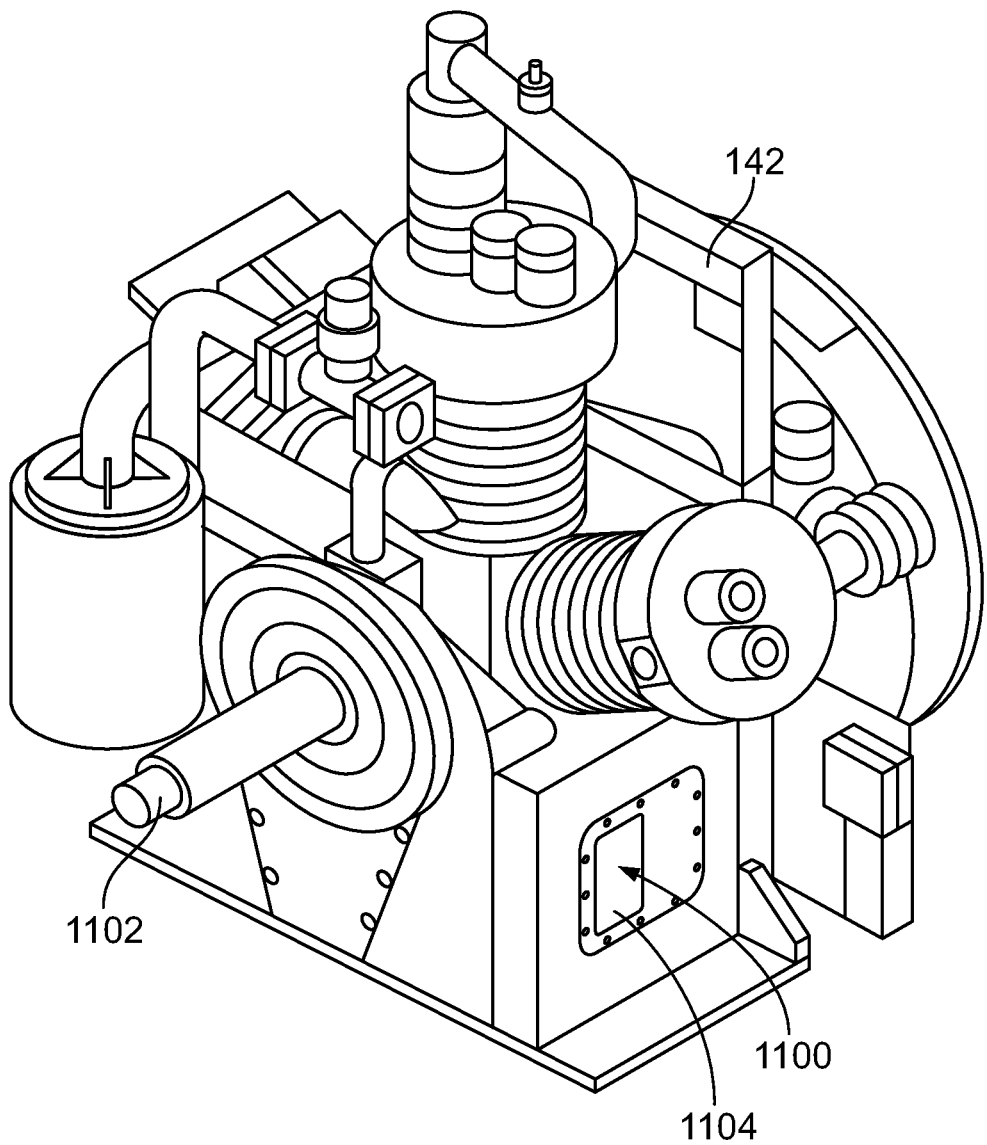
FIG. 11 provides a front perspective view of another equipment control system coupled with a compressor and motor.
Figure 12:
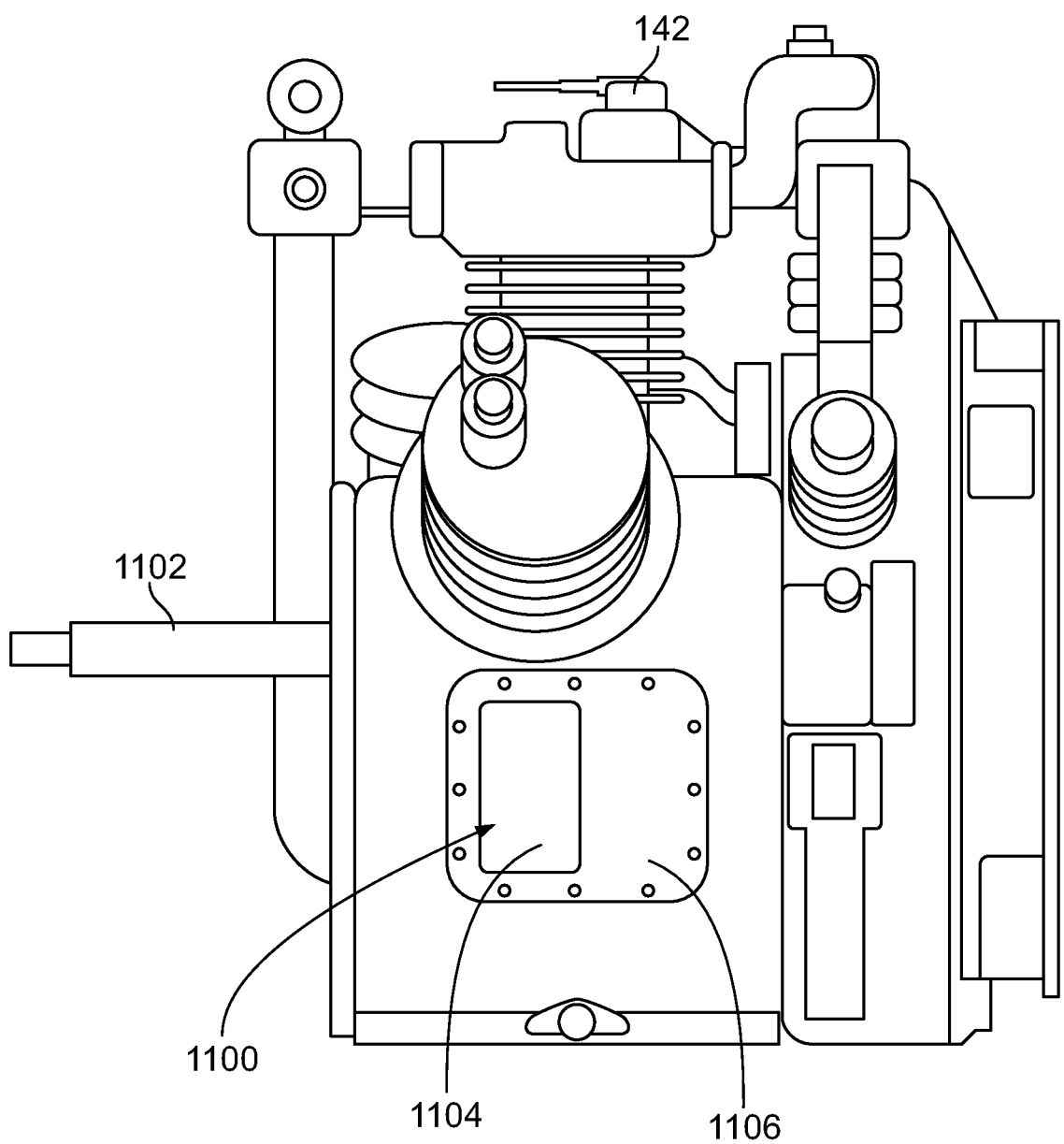
FIG. 12 provides a first side view of the equipment control system shown in FIG. 11 coupled with a compressor and motor.
Figure 13:
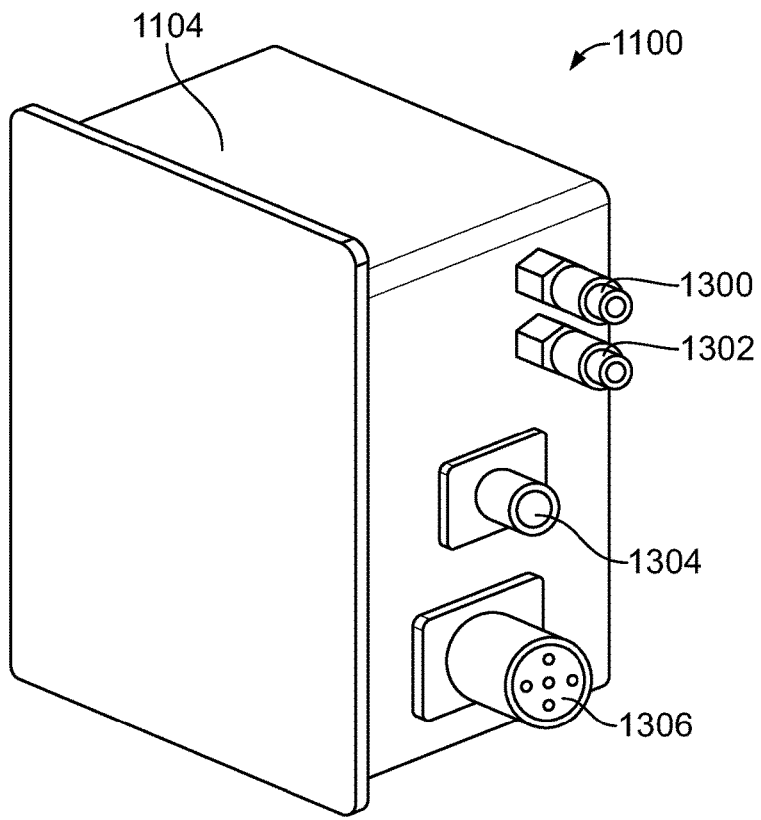
FIG. 13 provides a front perspective view of the equipment control system shown in FIG. 11.
Figure 14:
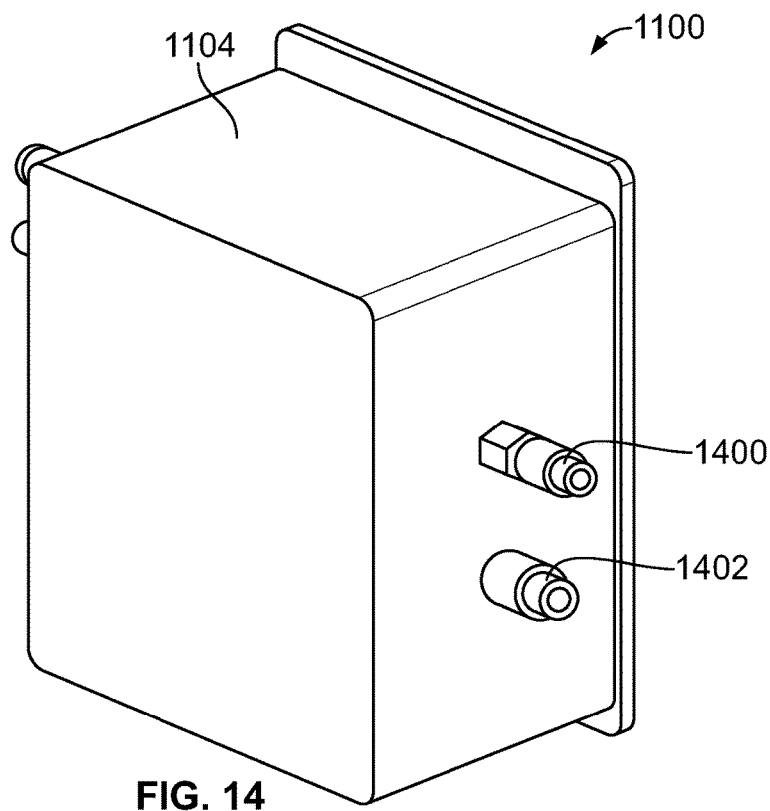
FIG. 14 provides a rear perspective view of the equipment control system shown in FIG. 11.

FIGS. 11 through 14 illustrate an example of an equipment control system 1100. FIG. 11 provides a front perspective view of the equipment control system coupled with a compressor and motor, FIG. 12 provides a first side view of the equipment control system coupled with the compressor and motor, FIG. 13 provides a front perspective view of the equipment control system, and FIG. 14 provides a rear perspective view of the equipment control system. As described herein, the equipment control system can monitor characteristics of a powered system and directly or indirectly deactivate one or more components of the powered system based on the characteristics. In one example, the equipment control system can be placed between a source or sender of information (e.g., one or more sensors) and a receiver or listener of the information (e.g., a controller or control unit, such as an engine control unit). The equipment control system can intercept or otherwise receive the information from the source before the information is received by the receiver. The equipment control system can determine whether the information indicates that a component should be deactivated and, if so, prevents the receiver from receiving the information, sends other information to the receiver, or modifies the information sent to the receiver. The interruption of the information, sending of other information, or modifying of the information can cause the receiver to deactivate the component, as described herein. This can provide for the equipment control system to independently shut down the component without having to change how the receiver of information otherwise operates to control the component (including shutting down the component).

In one embodiment, the equipment control system can operate as a compressor shutdown device that shuts down, turns off, or otherwise deactivates a compressor onboard a vehicle as described herein. Optionally, however, the equipment control system can operate to shut down, turn off, or otherwise deactivate another component. While the description herein focuses on a compressor, not all embodiments are limited to deactivating compressors. One or more embodiments can be used to deactivate another component. Additionally, the component that is deactivated optionally may not be disposed on a vehicle.

The equipment control system can communicate with a compressor 142 and/or a motor 1102. The equipment control system, the compressor, and the motor may be associated with certain equipment, such as a vehicle. The equipment control system has a housing or enclosure 1104 that may be mounted to a vehicle via a mounting plate 1106.

The housing or enclosure includes several input and/or output ports and/or connectors. These ports and/or connectors can include fluid ports or connectors that receive and/or output a fluid. For example, a circuit input port 1300 (shown in FIG. 13) connects with a fluid conduit, such as a hose or pipe, to fluidly couple the housing or enclosure with a pneumatic or fluid circuit. The circuit input port can receive and direct fluid from the fluid circuit that is at least partially pressurized by the compressor. For example, the circuit input port can receive air from an air brake system of a vehicle. As described below, the pressure of the fluid entering via the input port can be monitored (e.g., by one or more of the controllers of the vehicle control systems described herein) to determine whether the pressure of the fluid in the fluid circuit exceeds an upper designated threshold. This threshold can be referred to as a cut out pressure.

The ports and/or connectors can include a supply input port 1302 (shown in FIG. 13). The supply input port can fluidly couple the housing or enclosure with a supply of the fluid, such as a fluid reservoir. This supply can include an air reservoir of the air brake system. In the air brake system, the fluid circuit may include pressurized air that prevents activation of the air brakes. An additional amount of the air can be stored in the air reservoir. Upon engagement of the air brakes, the air pressure in the circuit decreases or is depleted. Subsequently, the air from the reservoir begins to re-pressurize the circuit while the compressor pressurizes additional air for the circuit and/or air reservoir.

The housing or enclosure includes electric sensor connectors 1304, 1306 that receive data output from one or more upstream sensors. These connectors can conductively couple with cables, wires, or the like, to receive data signals from the sensors. Optionally, the equipment control system can include wireless receiving or transceiving circuitry that wirelessly receives the signals. As described herein, this data can represent operations or characteristics of operation of the motor, the compressor, or another component.

The housing or enclosure can include an output port 1400 and an output connector 1402 (shown in FIG. 14). The output port can fluidly couple with a conduit that is connected with an unloader system of the compressor. As described below, this pressure sensor can be operably coupled with the controller to monitor the fluid pressure received from the output port to determine whether the fluid pressure exceeds the unloader threshold.

Figure 15:
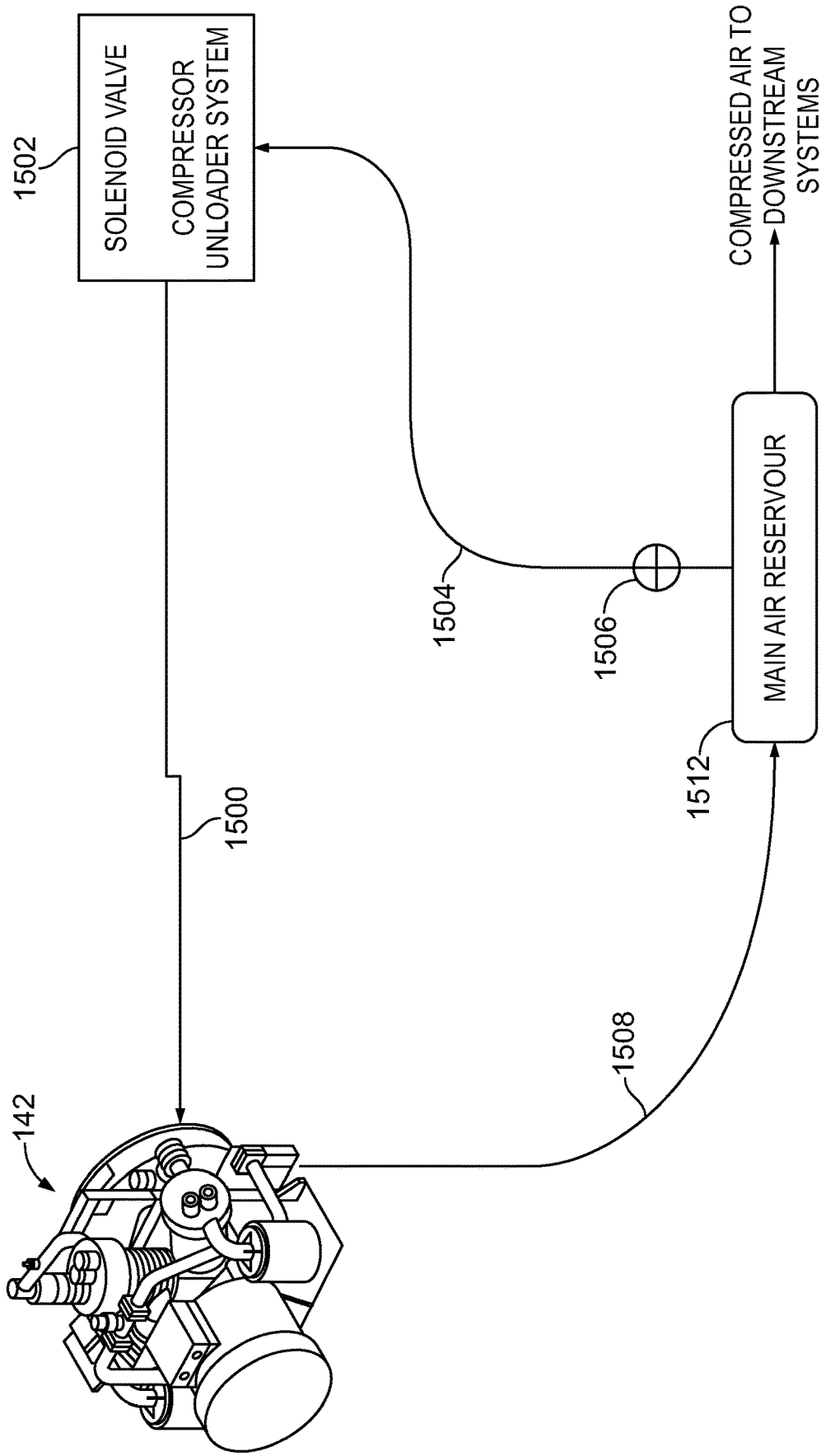
FIG. 15 schematically illustrates the equipment control system shown in FIG. 11.

FIG. 15 illustrates one example of operation of the compressor 142 without the equipment control system. The compressor is fluidly coupled with a main air reservoir 1512 by a first conduit or air line 1508. Pressurized air that is discharged from the compressor 142 is directed to the reservoir 1512 via the first air line 1508. The pressure of the air in the reservoir 1512 can be monitored by a sensor, such as a pressure transducer or pressure switch 1506 that is fluidly coupled with the reservoir 1512 and with a valve 1502 of a compressor unloader system by a second conduit or air line 1504. When the pressure in the reservoir 1512 reaches an upper limit or maximum pressure, the sensor 1506 sends a signal to the valve 1502. The valve 1502 opens responsive to receiving this signal. This allows the air in the reservoir 1512 to be routed back to the compressor 142 via the second air line 1504 and a third conduit or air line 1500 that fluidly couples the valve 1502 with the compressor 142. When this occurs, the compressor 142 can continue to operate, but no longer creates additional pressure in the reservoir 1512.

Figure 16:
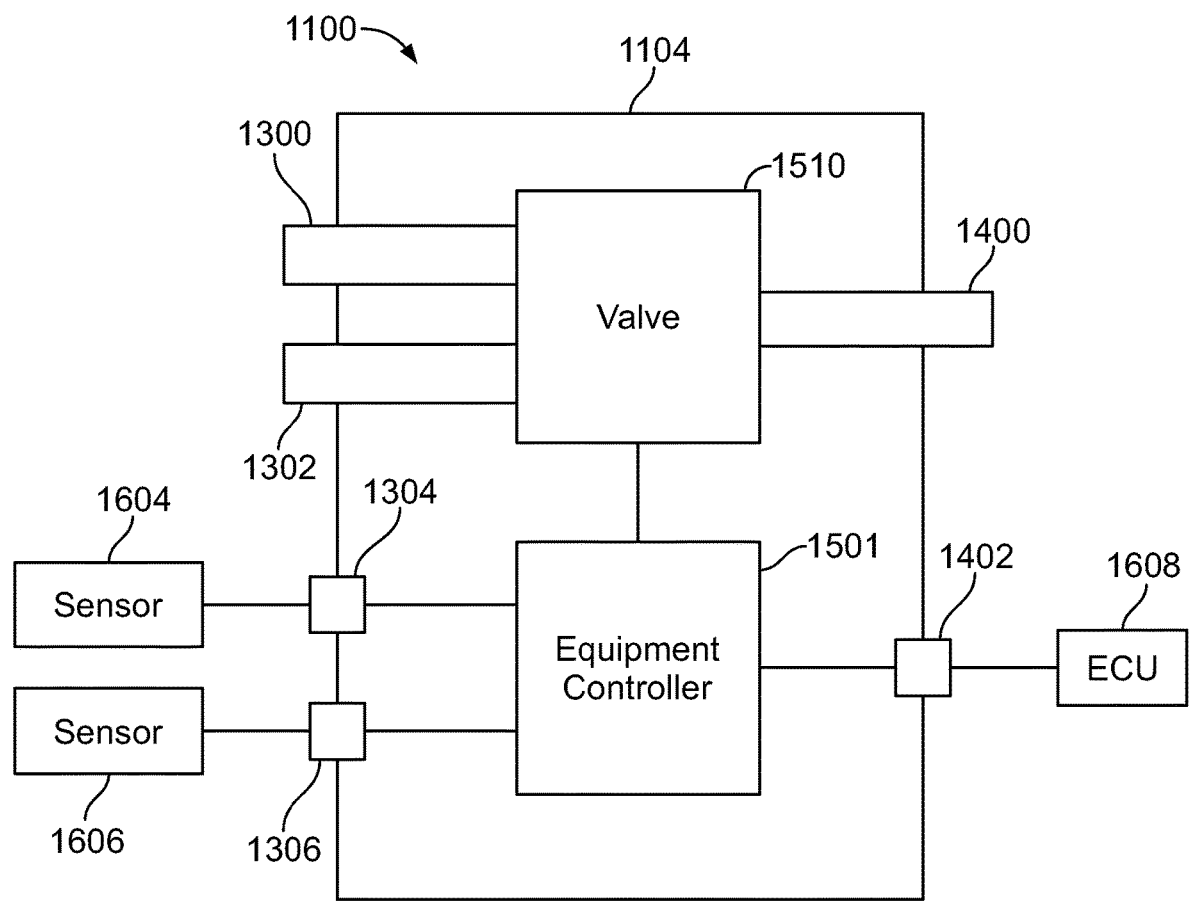
FIG. 16 illustrates a flowchart of one embodiment of a method for monitoring operation of equipment.
Figure 17:
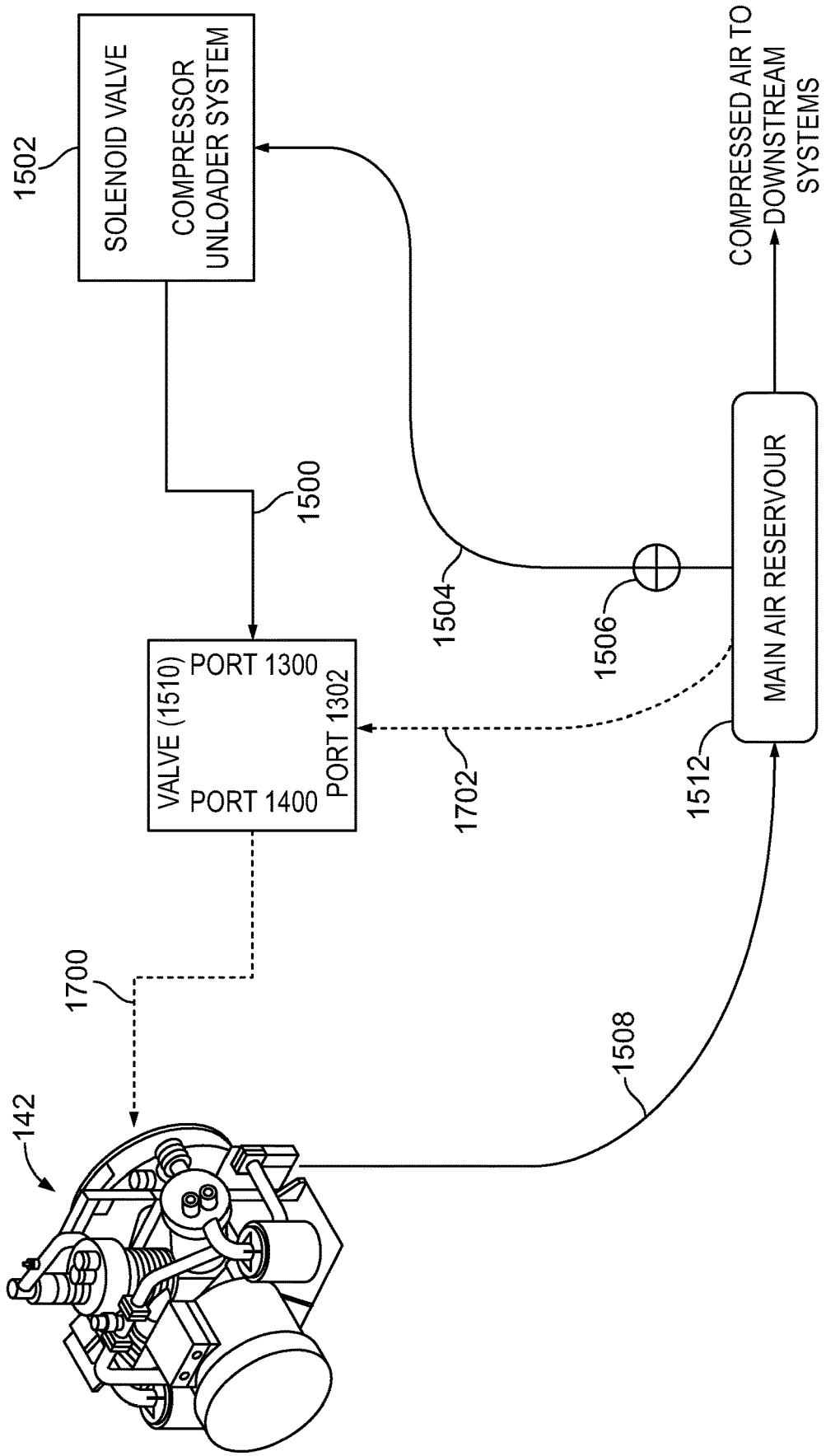
FIG. 17 illustrates one example of operation of the equipment control system.

FIG. 16 schematically illustrates the equipment control system. FIG. 17 illustrates one example of operation of the equipment control system. The equipment control system includes an equipment controller 1502 that represents hardware circuitry that includes and/or is connected with one or more processors. The equipment controller performs the operations described herein under the direction of hard-wired and/or memory-stored instructions (e.g., software). The equipment control system includes an internal valve 1510 that switches between positions or states under control of the equipment controller 1502.

As shown in FIG. 17, the port 1400 of the equipment control system is fluidly coupled with the compressor 142 by a conduit or air line 1700. The port 1300 of the equipment control system is fluidly coupled with the valve 1502 by the air line 1500. The port 1302 is fluidly coupled with the reservoir 1512 by a conduit or air line 1702. These connections fluidly couple the internal valve 1510 with the compressor 142 via the port 1400 and the air line 1700, with the valve 1502 via air line 1500, and with the reservoir 1512 via the air line 1702.

A sensor 1604 may be communicatively and/or conductively coupled with the equipment controller by the port or connector 1304 and a sensor 1606 may be communicatively and/or conductively coupled with the equipment controller by the port or connector 1306. The sensors 1604, 1606 can be sensors that output sensor information or data to a system controller 1608. The system controller can represent one or more of the controllers described herein (e.g., the controllers 150, 550, 650, 750, 850, 950. The equipment controller can intercept or otherwise receive the sensor data from the upstream sensor(s) prior to the sensor data being sent to the system controller. For example, the sensor data can be output from the upstream sensors and sent to the equipment controller before the sensor data is sent to the system controller. Alternatively, the upstream sensors may send the sensor data to the equipment controller and the system controller in parallel such that the equipment controller and the system controller both receive the sensor data from the upstream sensors without the sensor data first passing through or being sent to another one of the controllers.

A variety of characteristics of the powered system (e.g., a vehicle), equipment (e.g., a compressor, compressor motor, or the like), or other components can be sensed by the upstream sensors. In one example, the upstream sensor 1604 is a speed sensor that measures how quickly the motor 1102 is operating. The upstream speed sensor can output data that indicates the motor speed, such as in terms of a frequency or counter that is converted by the ECU into revolutions per minute (or other units). The upstream sensor 1606 can be another type of sensor, such as a pressure sensor, temperature sensor, or the like. The upstream sensor 1606 can measure characteristics of the equipment (e.g., compressor) such as oil pressure, oil temperature, fluid pressure generated by the compressor, or the like. Optionally, the upstream sensor 1606 can measure another characteristic. While two upstream sensors are shown, alternatively, only a single upstream sensor may be used, or more than three upstream sensors may be used.

The equipment controller can monitor operation of the compressor using or based on the upstream sensor data. The equipment controller can determine whether the operation of the compressor is outside of a determined or designated range of values (e.g., below a lower limit or above an upper limit, within one or more groups of values, etc.). For example, the equipment controller can determine whether the lubricant (e.g., oil) pressure of the compressor is too low (e.g., is below a lower pressure limit), whether the lubricant pressure is too great (e.g., greater than an upper pressure limit), whether the lubricant temperature is too hot (e.g., is hotter than an upper temperature limit), or the like. During normal operation (where no fault is detected based on the sensor output), the compressor 142 will operate by generating or outputting pressurized air to the reservoir 1512 via the air line 1508. The pressure of the air in the reservoir 1512 can be monitored by the sensor 1506 that is fluidly coupled with the reservoir 1512. When the pressure in the reservoir 1512 reaches an upper limit or maximum pressure, the sensor 1506 sends a signal to the valve 1502. The valve 1502 opens responsive to receiving this signal. This allows the air in the reservoir 1512 to be routed back to the compressor 142 via the second air line 1504, the air line 1500, the port 1300, the internal valve 1510, the port 1400, and the air line

1700. When this occurs, the compressor 142 can continue to operate, but no longer creates additional pressure in the reservoir 1512.

If a fault is detected by the equipment controller (e.g., based on the output from the sensor 1604 and/or 1606 being outside of a normal or expected range of values), the equipment controller can change the state or position of the internal valve 1510. For example, the equipment controller can change the state of the internal valve 1510 such that the port 1302 is fluidly coupled with the port 1400. This can cause the compressor 142 to unload and direct the air around (e.g., bypass) the valve 1502. This allows the compressor 142 to be unloaded regardless of the pressure measured by the sensor 1506.

The equipment controller can implement different responsive actions based on which several ranges of values that a measured characteristic is outside of or within. For example, if the operation of the compressor (e.g., the temperature, the output pressure, the speed, etc.) is outside a first designated range of values, the equipment controller can change the state of the valve 1510 to unload the compressor, as described above. But, responsive to the operation of the compressor being outside of a different, second designated range of values, the equipment controller can prevent communication of the speed signal to the system controller (or can communicate a signal to the system controller to notify the system controller of the compressor operation).

Optionally, the equipment controller can use machine learning to determine which responsive action to implement. The equipment controller can include or have access to a tangible and non-transitory computer-readable storage medium, such as a computer hard drive, solid state memory, removable memory, optical disk, or the like. The equipment controller can store values of the characteristics sensed by one or more of the upstream and/or downstream sensors, the thresholds (e.g., speed thresholds, temperature thresholds, and/or pressure thresholds), responsive actions implemented (e.g., changing the state of the valve, interrupting the speed signal, communicating another signal to the controller that indicates the pressure or violation of a threshold), etc. The equipment controller can examine changes in the characteristics sensed by the sensors following implementation of responsive actions, and learn which responsive actions are more effective than others to change some sensed characteristics. The equipment controller can develop rules to determine which responsive action to implement (or whether to implement any responsive action at all) given a set of characteristics sensed by the sensors to change one or more of these characteristics. For example, the equipment controller can learn that an increasing trend in the lubricant temperature can be responded to by repeatedly changing the state of the valve to switch the compressor between loaded and unloaded states. This can allow the lubricant temperature to remain below a threshold at which the equipment controller otherwise would interrupt the speed signal (e.g., prevent communication of the signal). This also can allow for the compressor to keep operating without damaging or having to deactivate the compressor. Optionally, the equipment controller can use machine learning to change the determined or designated range of values in which operation of the compressor need not be changed. For example, the equipment controller can learn which ranges of lubricant temperatures and/or pressures in which the compressor can operate without implementing a responsive action and which ranges in which the compressor cannot continue operating without implementing a responsive action.

Figure 18:
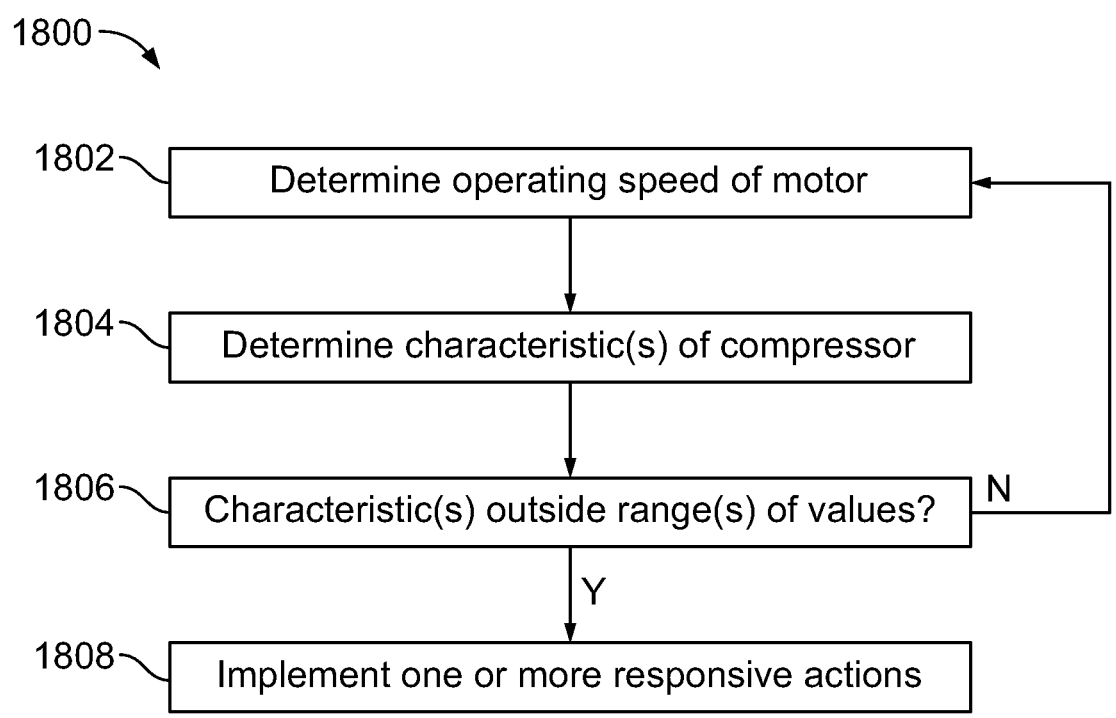
FIG. 18 illustrates a flowchart of one embodiment of a method for monitoring operation of equipment.

FIG. 18 illustrates a flowchart of one embodiment of a method 1600 for monitoring operation of equipment. The method can represent operations performed by the equipment controller 1501 to monitor and control (e.g., indirectly control) operation of equipment such as the compressor 142. At 1802, an operating speed of a motor driving the compressor is determined. This operating speed can be determined from a speed signal that is output by a speed sensor monitoring the speed at which the motor operates. At 1804, one or more operating characteristics of the compressor are determined. These characteristics can include a pressure at which the compressor is compressing a fluid (e.g., a gas such as air), a pressure of a lubricant of the compressor, a temperature of the compressor lubricant, or the like. A gas pressure sensor can measure the pressure at which the compressor is compressing the fluid, an oil pressure sensor can measure the lubricant pressure, and an oil temperature sensor can measure the lubricant temperature.

At 1806, a determination is made as to whether one or more of the characteristics are outside of a designated range of values. For example, a determination is made as to whether the lubricant temperature is hotter than one or more thresholds, whether the lubricant pressure is greater than one or more thresholds, whether the compressor pressure is greater or less than one or more thresholds, or the like. If the characteristic does fall outside a designated range of values, then operation of the compressor may need to stop or be changed to prevent damage to the compressor. As a result, flow of the method can proceed toward 1808. But, if the characteristic is within the designated range of values, then operation of the compressor may continue without change. As a result, flow of the method can return toward 1802 for continued monitoring of the compressor. Optionally, the method can terminate.

At 1808, one or more responsive actions are implemented. As one example, the compressor is indirectly shut down by the equipment controller interrupting communication of the speed signal from the speed sensor to the system controller. This can cause the system controller to deactivate the compressor and/or motor that is driving the compressor. As another example, the compressor is indirectly changed to an unloaded state by the equipment controller changing a state of an internal valve to direct gas from a reservoir back to the compressor via the internal valve. This can cause the system controller to change the compressor from the loaded state to the unloaded state. Alternatively, one or more other actions may be implemented. Flow of the method can return toward 1602 or may terminate.

In one embodiment, a method includes monitoring operation of a compressor, determining whether the operation of the compressor is outside of a designated range of values, and, responsive to determining that the operation of the compressor is outside of the designated range of values, one or more of (a) preventing communication of a signal to a system controller that controls operation of the compressor, (b) directing a gas from a reservoir to a pressure sensor used by the system controller to determine a gas pressure generated by the compressor, and/or (c) communicating the signal to the system controller that controls operation of the compressor.

Optionally, the system controller deactivates the compressor responsive to the system controller not receiving the signal.

Optionally, the system controller changes the compressor to an unloaded state from a loaded state responsive to the gas directed from the reservoir exceeding an upper pressure threshold.

Optionally, the compressor continues to operate in the unloaded state without increasing the gas pressure in one or more conduits.

Optionally, monitoring the operation of the compressor includes determining one or more of a lubricant pressure, a lubricant temperature, or the gas pressure of the compressor.

Optionally, directing the gas from the reservoir includes increasing a total pressure in one or more conduits above the gas pressure generated by the compressor.

Optionally, preventing communication of the signal to the system controller includes interrupting communication of a speed signal from a speed sensor measuring a speed of the compressor to the system controller.

Optionally, the method also includes, while the operation of the compressor is within the designated range of values, one or more of (d) communicating the signal from the compressor to the system controller that controls operation of the compressor and/or (e) preventing flow of the gas from the reservoir to the pressure sensor.

Optionally, determining that the operation of the compressor is outside of the designated range of values includes determining whether the operation of the compressor is outside of a first group of the designated range of values or whether the operation of the compressor is outside of a second group of the designated range of values. The method also can include, responsive to determining that the operation of the compressor is outside the first group of the designated range of values, directing the gas from the reservoir to the pressure sensor, and, responsive to determining that the operation of the compressor is outside the second group of the designated range of values, preventing communication of the signal from the compressor to the system controller.

In one embodiment, a system includes an equipment controller configured to monitor monitoring operation of a compressor. The equipment controller is configured to determine whether the operation of the compressor is outside of a designated range of values. The equipment controller also is configured to one or more of (a) prevent communication of a signal from the compressor to a system controller that controls operation of the compressor and/or (b) direct a gas from a reservoir to a pressure sensor used by the system controller to determine a gas pressure generated by the compressor responsive to determining that the operation of the compressor is outside of the designated range of values.

Optionally, the system controller deactivates the compressor responsive to the system controller not receiving the signal.

Optionally, the system controller changes the compressor to an unloaded state from a loaded state responsive to the gas directed from the reservoir exceeding an upper pressure threshold.

Optionally, the equipment controller is configured to continue operating the compressor in the unloaded state without increasing the gas pressure in one or more conduits.

Optionally, the equipment controller is configured to monitor the operation of the compressor by determining one or more of a lubricant pressure, a lubricant temperature, or the gas pressure of the compressor.

Optionally, the equipment controller is configured to direct the gas from the reservoir to increase a total pressure in one or more conduits above the gas pressure generated by the compressor.

Optionally, the equipment controller is configured to prevent communication of the signal from the compressor to the system controller by interrupting communication of a speed signal from a speed sensor measuring a speed of the compressor to the system controller.

Optionally, the equipment controller is configured to, while the operation of the compressor is within the designated range of values, one or more of (c) communicate the signal from the compressor to the system controller that controls operation of the compressor or (d) prevent flow of the gas from the reservoir to the pressure sensor.

In one embodiment, a system includes a compressor configured to be disposed onboard a vehicle and to operate to increase a gas pressure in one or more conduits of the vehicle, a system controller configured to control operation of the compressor, and an equipment controller configured to monitor monitoring operation of the compressor. The equipment controller is configured to determine whether the operation of the compressor is outside of a designated range of values. The equipment controller is configured to one or more of (a) prevent communication of a signal from the compressor to the system controller that controls operation of the compressor and/or (b) direct a gas from a reservoir to a pressure sensor used by the system controller to determine a gas pressure generated by the compressor responsive to determining that the operation of the compressor is outside of the designated range of values.

Optionally, the system controller is configured to deactivate the compressor responsive to the system controller not receiving the signal and the system controller is configured to change the compressor to an unloaded state from a loaded state responsive to the gas directed from the reservoir exceeding an upper pressure threshold.

Optionally, the equipment controller is configured to direct the gas from the reservoir to increase a total pressure in one or more conduits above the gas pressure generated by the compressor.

In one embodiment, a method includes determining a range of designated values for operation of a compressor using machine learning, determining whether a monitored or sensed designated value of the operation of the compressor is within the range of designated values, and, responsive to determining that at least one of the monitored or sensed designated values is outside of the one or more designated range, one or more of (a) preventing communication of a signal from the compressor to a system controller that controls operation of the compressor, (b) directing a gas from a reservoir to a pressure sensor used by the system controller to determine a gas pressure generated by the compressor, (c) shutting down the compressor, and/or (d) switching the compressor to an unloaded state.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
monitoring operation of a compressor;
determining whether the operation of the compressor is outside of a designated range of values; and
responsive to determining that the operation of the compressor is outside of the designated range of values,
preventing communication of a signal to a system controller that controls operation of the compressor, and
directing a gas from a reservoir to a pressure sensor used by the system controller to determine a gas pressure generated by the compressor.

2. The method of claim 1, wherein the system controller deactivates the compressor responsive to the system controller not receiving the signal.

3. The method of claim 1, wherein the system controller changes the compressor to an unloaded state from a loaded state responsive to the gas directed from the reservoir exceeding an upper pressure threshold.

4. The method of claim 3, wherein the compressor continues to operate in the unloaded state without increasing the gas pressure in one or more conduits.

5. The method of claim 1, wherein monitoring the operation of the compressor includes determining one or more of a lubricant pressure, a lubricant temperature, or the gas pressure of the compressor.

6. The method of claim 1, wherein directing the gas from the reservoir includes increasing a total pressure in one or more conduits above the gas pressure generated by the compressor.

7. The method of claim 1, wherein preventing communication of the signal to the system controller includes interrupting communication of a speed signal from a speed sensor measuring a speed of the compressor to the system controller.

8. The method of claim 1, further comprising, while the operation of the compressor is within the designated range of values, preventing flow of the gas from the reservoir to the pressure sensor.

9. The method of claim 1, wherein determining that the operation of the compressor is outside of the designated range of values includes determining whether the operation of the compressor is outside of a first group of the designated range of values or whether the operation of the compressor is outside of a second group of the designated range of values, and further comprising:
responsive to determining that the operation of the compressor is outside the first group of the designated range of values, directing the gas from the reservoir to the pressure sensor; and
responsive to determining that the operation of the compressor is outside the second group of the designated range of values, preventing communication of the signal from the compressor to the system controller.

10. A system comprising:
an equipment controller configured to monitor monitoring operation of a compressor, the equipment controller configured to determine whether the operation of the compressor is outside of a designated range of values,
the equipment controller configured to (a) prevent communication of a signal from the compressor to a system controller that controls operation of the compressor, and (b) direct a gas from a reservoir to a pressure sensor used by the system controller to determine a gas pressure generated by the compressor responsive to determining that the operation of the compressor is outside of the designated range of values.

11. The system of claim 10, wherein the system controller deactivates the compressor responsive to the system controller not receiving the signal.

12. The system of claim 10, wherein the system controller changes the compressor to an unloaded state from a loaded state responsive to the gas directed from the reservoir exceeding an upper pressure threshold.

13. The system of claim 12, wherein the equipment controller is configured to continue operating the compressor in the unloaded state without increasing the gas pressure in one or more conduits.

14. The system of claim 10, wherein the equipment controller is configured to monitor the operation of the compressor by determining one or more of a lubricant pressure, a lubricant temperature, or the gas pressure of the compressor.

15. The system of claim 10, wherein the equipment controller is configured to direct the gas from the reservoir to increase a total pressure in one or more conduits above the gas pressure generated by the compressor.

16. The system of claim 10, wherein the equipment controller is configured to prevent communication of the signal from the compressor to the system controller by interrupting communication of a speed signal from a speed sensor measuring a speed of the compressor to the system controller.

17. The system of claim 10, wherein the equipment controller is configured to, while the operation of the compressor is within the designated range of values, one or more of (c) communicate the signal from the compressor to the system controller that controls operation of the compressor or (d) prevent flow of the gas from the reservoir to the pressure sensor.

18. A system comprising:
a compressor configured to be disposed onboard a vehicle and to operate to increase a gas pressure in one or more conduits of the vehicle;
a system controller configured to control operation of the compressor; and
an equipment controller configured to monitor monitoring operation of the compressor, the equipment controller configured to determine whether the operation of the compressor is outside of a designated range of values,
the equipment controller configured to (a) prevent communication of a signal from the compressor to the system controller that controls operation of the compressor, and (b) direct a gas from a reservoir to a pressure sensor used by the system controller to determine a gas pressure generated by the compressor responsive to determining that the operation of the compressor is outside of the designated range of values.

19. The system of claim 18, wherein the system controller is configured to deactivate the compressor responsive to the system controller not receiving the signal and the system controller is configured to change the compressor to an unloaded state from a loaded state responsive to the gas directed from the reservoir exceeding an upper pressure threshold.

20. The system of claim 18, wherein the equipment controller is configured to direct the gas from the reservoir to increase a total pressure in one or more conduits above the gas pressure generated by the compressor.

21. A method, comprising:
determining a range of designated values for operation of a compressor using machine learning;
determining whether a monitored or sensed designated value of the operation of the compressor is within the range of designated values; and
responsive to determining that at least one of the monitored or sensed designated values is outside of the one or more designated range,
preventing communication of a signal from the compressor to a system controller that controls operation of the compressor;
directing a gas from a reservoir to a pressure sensor used by the system controller to determine a gas pressure generated by the compressor; and one or both of:
shutting down the compressor; or
switching the compressor to an unloaded state.

\* \* \* \* \*